US010836883B2

(12) United States Patent
Hebrink

(10) Patent No.: US 10,836,883 B2
(45) Date of Patent: Nov. 17, 2020

(54) LIGHT TRANSPARENT FLUOROPOLYMER COMPOSITION AND ARTICLE

(71) Applicant: 3M INNOVATIVE PROPERTIES COMPANY, St. Paul, MN (US)

(72) Inventor: Timothy J. Hebrink, Scandia, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 374 days.

(21) Appl. No.: 15/318,556

(22) PCT Filed: Jun. 3, 2015

(86) PCT No.: PCT/US2015/033952
§ 371 (c)(1),
(2) Date: Dec. 13, 2016

(87) PCT Pub. No.: WO2015/195334
PCT Pub. Date: Dec. 23, 2015

(65) Prior Publication Data
US 2017/0145183 A1 May 25, 2017

Related U.S. Application Data

(60) Provisional application No. 62/013,796, filed on Jun. 18, 2014.

(51) Int. Cl.
*C08K 3/26* (2006.01)
*C08K 3/105* (2018.01)
(Continued)

(52) U.S. Cl.
CPC .................. *C08K 3/26* (2013.01); *B32B 3/30* (2013.01); *B32B 27/18* (2013.01); *B32B 27/283* (2013.01);
(Continued)

(58) Field of Classification Search
CPC .......... C08K 3/26; C08K 3/105; C08K 5/005; C08K 5/17; C08K 5/3435;
(Continued)

(56) References Cited

U.S. PATENT DOCUMENTS 2,803,615 A 8/1957 Ahlbrecht
3,553,179 A 1/1971 Bartlett
(Continued)

FOREIGN PATENT DOCUMENTS

CN 102643445 8/2012
CN 102731944 10/2012
(Continued)

OTHER PUBLICATIONS

Arcella, Chapter 2, Fluorocarbon Elastomers, Section 2, "Chemical Structure and Related Properties", *Modern Fluoropolymers: High Performance Polymers for Diverse Applications*, Wiley Series in Polymer Science, SCHEIRS (ed), John Wiley & Sons Ltd, West Sussex, England, (1997) pp. 72-90.
(Continued)

*Primary Examiner* — Ling Siu Choi
*Assistant Examiner* — Ronald Grinsted
(74) *Attorney, Agent, or Firm* — Julie Lapos-Kuchar; James Baker

(57) ABSTRACT

Light transparent fluoropolymer composition having less than 2 percent haze, comprising at least one of alkali metal (e.g., lithium, sodium, and potassium) cation, alkali metal (e.g., lithium, sodium, and potassium) and a corresponding anion (e.g., $CO_3$, OH, $OOCCH_3$), alkaline earth metal cation (e.g., calcium, magnesium, strontium, and barium), or alkaline earth metal cation (e.g., calcium, magnesium, strontium, and barium) and a corresponding anion (e.g., $CO_3$, OH, $OOCCH_3$), wherein the light transparent fluoropolymer has at least 90% visible light transmission. Exemplary uses of
(Continued)

light transparent fluoropolymer compositions described herein include as films (e.g., solar reflective films, solar transparent frontside photovoltaic films, commercial graphic overlay film, commercial graphic film, and tubing (e.g., transparent tubing for medical)).

20 Claims, 4 Drawing Sheets

(51) Int. Cl.
| | |
|---|---|
| B32B 3/30 | (2006.01) |
| B32B 27/18 | (2006.01) |
| B32B 27/28 | (2006.01) |
| B32B 27/30 | (2006.01) |
| B32B 27/32 | (2006.01) |
| C08J 5/18 | (2006.01) |
| C08K 5/00 | (2006.01) |
| C08K 5/17 | (2006.01) |
| C08K 5/3435 | (2006.01) |
| C08L 27/12 | (2006.01) |
| C08L 27/16 | (2006.01) |
| C08L 27/18 | (2006.01) |
| C08L 27/20 | (2006.01) |
| C08L 33/12 | (2006.01) |

(52) U.S. Cl.
CPC .......... *B32B 27/285* (2013.01); *B32B 27/302* (2013.01); *B32B 27/304* (2013.01); *B32B 27/308* (2013.01); *B32B 27/32* (2013.01); *B32B 27/322* (2013.01); *C08J 5/18* (2013.01); *C08K 3/105* (2018.01); *C08K 5/005* (2013.01); *C08K 5/17* (2013.01); *C08K 5/3435* (2013.01); *C08L 27/12* (2013.01); *C08L 27/16* (2013.01); *C08L 27/18* (2013.01); *C08L 27/20* (2013.01); *C08L 33/12* (2013.01); *B32B 2250/24* (2013.01); *B32B 2250/44* (2013.01); *B32B 2264/102* (2013.01); *B32B 2264/104* (2013.01); *B32B 2307/412* (2013.01); *B32B 2307/732* (2013.01); *B32B 2457/12* (2013.01); *B32B 2535/00* (2013.01); *B32B 2590/00* (2013.01); *B32B 2597/00* (2013.01); *C08J 2327/12* (2013.01); *C08J 2327/16* (2013.01); *C08J 2327/18* (2013.01); *C08J 2327/20* (2013.01); *C08K 2003/262* (2013.01); *C08K 2003/265* (2013.01); *C08K 2201/011* (2013.01); *C08L 2203/16* (2013.01)

(58) Field of Classification Search
CPC ........ C08K 2003/262; C08K 2003/265; C08K 2201/011; C08K 2201/01; B32B 3/30; B32B 27/18; B32B 27/283; B32B 27/285; B32B 27/302; B32B 27/304; B32B 27/308; B32B 27/32; B32B 27/322; B32B 2250/24; B32B 2250/44; B32B 2264/102; B32B 2264/104; B32B 2307/412; B32B 2307/732; B32B 2457/12; B32B 2535/00; B32B 2590/00; B32B 2597/00; C08J 5/18; C08J 2327/12; C08J 2327/16; C08J 2327/18; C08J 2327/20; C08L 27/12; C08L 27/16; C08L 27/18; C08L 27/20; C08L 33/12; C08L 2203/16
USPC ...................................................... 524/425
See application file for complete search history.

(56) References Cited

U.S. PATENT DOCUMENTS

| | | | |
|---|---|---|---|
| 4,687,801 A * | 8/1987 | Mitani ................. | C08L 101/00 524/104 |
| 5,504,134 A | 4/1996 | Palmer | |
| 5,876,688 A | 3/1999 | Laundon | |
| 6,664,354 B2 | 12/2003 | Savu | |
| 6,783,349 B2 | 8/2004 | Neavin | |
| 2009/0082510 A1 | 3/2009 | Miyamori | |
| 2011/0255155 A1* | 10/2011 | Hebrink ................. | B32B 27/08 359/359 |
| 2011/0288221 A1 | 11/2011 | Miyamori | |
| 2013/0046058 A1 | 2/2013 | Pham et al. | |
| 2014/0088248 A1 | 3/2014 | Kasahara et al. | |

FOREIGN PATENT DOCUMENTS

| | | | |
|---|---|---|---|
| EP | 0841151 | 5/1998 | |
| EP | 0841151 A2 * | 5/1998 | ....... B29D 11/00663 |
| EP | 0870778 | 10/1998 | |
| EP | 1311637 | 5/2003 | |
| EP | 2716704 | 4/2014 | |
| EP | 2716704 A1 * | 4/2014 | ............ C08F 214/18 |
| EP | 2 980 131 A1 | 2/2016 | |
| JP | 61174210 | 8/1986 | |
| JP | 2002-194008 A | 7/2002 | |
| JP | 2008-019377 A | 1/2008 | |
| JP | 2013-227447 A | 11/2013 | |

OTHER PUBLICATIONS

International Search Report for PCT International Application No. PCT/US2015/033952, dated Aug. 24, 2015, 3 pages.
Search Report/Written Opinion from Intellectual Property Office of Singapore on Singapore Patent Application No. 11201610566S; date of actual completion of the search, Dec. 18, 2017, 5 pages.
"Haze-Gard Plus, Operating Instructions", BYK Additives & Instruments, BYK-Gardner USA, Columbia, MD; BYK-Garner GmbH, Geretsried, Germany, Declaration of Conformity dated Dec. 10, 2010 (ISO-9001), 180 pages.

* cited by examiner

LIGHT TRANSPARENT FLUOROPOLYMER COMPOSITION AND ARTICLE

CROSS REFERENCE TO RELATED APPLICATIONS

This application is a national stage filing under 35 U.S.C. 371 of PCT/US2015/033952, filed Jun. 3, 2015, which claims the benefit of U.S. Provisional Application No. 62/013,796, filed Jun. 18, 2014, the disclosure of which is incorporated by reference in its/their entirety herein.

BACKGROUND

Extrusion processing of fluoropolymers can cause degradation by-products such as hydrofluoric acid which has a corrosive effect on common extrusion processing equipment and can create an undesirable environment for workers. A relatively expensive solution is to make the fluoropolymer extrusion processing equipment out of high nickel content stainless steels such as HASTELLOY and INCONEL. This solution does not address the undesirable environment for workers. In addition, high nickel content stainless steels are softer and have a tendency to wear more quickly. Alternative extrusion processing of fluoropolymers that address these corrosive effects on common extrusion processing equipment and undesirable environment for workers is desired.

SUMMARY

In one aspect, the present disclosure describes a light transparent fluoropolymer composition having less than 2 percent haze, comprising at least one of alkali metal (e.g., lithium, sodium, and potassium) cation, alkali metal (e.g., lithium, sodium, and potassium) and a corresponding anion (e.g., $CO_3$, OH, $OOCCH_3$), alkaline earth metal cation (e.g., calcium, magnesium, strontium, and barium), or alkaline earth metal cation (e.g., calcium, magnesium, strontium, and barium) and a corresponding anion (e.g., $CO_3$, OH, $OOCCH_3$), wherein the light transparent fluoropolymer has at least 90 (in some embodiments, at least 95, 96, 97, 98, or even greater than 99) % visible light transmission. In some embodiments, light transparent fluoropolymer compositions described herein, comprise at least 0.01 (in some embodiments, at least 0.05, or even at least 0.1; in some embodiments, up to 1.0; in some embodiments, in a range from 0.01 to 1, 0.05 to 1.0, or even, 0.1 to 1.0) percent by weight of the alkali metal ionic species and alkaline earth metal ionic species present, based on the total weight of the composition.

In one aspect, the present disclosure describes an article having a surface structured light transparent fluoropolymer film comprising at least one of alkali metal (e.g., lithium, sodium, and potassium) cation, alkali metal cation (e.g., lithium, sodium, and potassium) and a corresponding anion (e.g., $CO_3$, OH, $OOCCH_3$), alkaline earth metal cation (e.g., calcium, magnesium, strontium, and barium), or alkaline earth metal cation (e.g., calcium, magnesium, strontium, and barium) and a corresponding anion (e.g., $CO_3$, OH, $OOCCH_3$), wherein the surface structured light transparent fluoropolymer film has at least 95 (in some embodiments, at least 96, 97, 98, or even greater than 99) % visible light transmission. In some embodiments, at least 0.01 (in some embodiments, at least 0.05, or even at least 0.1; in some embodiments, up to 1.0; in some embodiments, in a range from 0.01 to 1.0, 0.05 to 1.0, or even, 0.1 to 1.0) percent by weight of the alkali metal ionic species and alkaline earth metal ionic species present, based on the total weight of the surface structured light transparent fluoropolymer in the film.

Exemplary uses of light transparent fluoropolymer compositions described herein include films (e.g., solar reflective films, solar transparent frontside photovoltaic films, commercial graphic overlay film, outdoor tape, and tubing (e.g., transparent tubing for medical applications, solar thermal heating of liquids)). Exemplary forms of articles described herein include surface structured anti-reflective films for the front side of photovoltaic modules and solar thermal panels.

DETAILED DESCRIPTION

Figure 1:
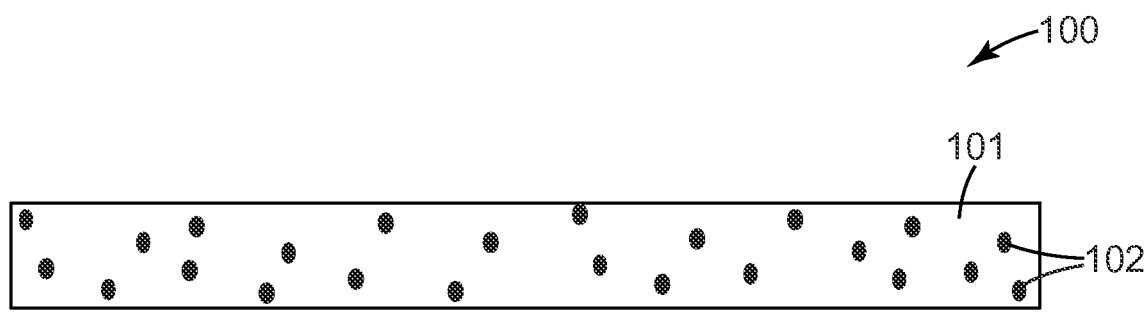
FIG. 1 is a cross-sectional view of an exemplary fluoropolymer film described herein.

Useful forms of light transparent fluoropolymer compositions described herein at least one of alkali metal (e.g., lithium, sodium, and potassium) cation, alkali metal (e.g., lithium, sodium, and potassium) and a corresponding anion (e.g., $CO_3$, OH, $OOCCH_3$), alkaline earth metal cation (e.g., calcium, magnesium, strontium, and barium), or alkaline earth metal cation (e.g., calcium, magnesium, strontium, and barium) and a corresponding anion (e.g., $CO_3$, OH, $OOCCH_3$). Exemplary forms of articles described herein include surface structured anti-reflective films include flat films, tapes, and tubing.

In some embodiments the light transparent fluoropolymer films or articles described herein, have a thickness in a range from 5 micrometers to 500 micrometers (in some embodiments, in a range from 25 micrometers to 1000 micrometers, or even 5 micrometers to 50 micrometers). In some embodiments, the films are monolayer films. In some embodiments, the films are multilayer films (e.g., at least 5, 10, 25, 50, 100, 500, or even at least 1000) layers.

In some embodiment, the films have an anti-reflective, structured (e.g., prismatic riblets) surface. In some embodiments the structured surface can have nanoscale features. In some embodiments, the films are extensible (approximately 10% to 200% elongation at break) at approximately 25° C. Extensibility allows the film to conform to a 3 dimensional shape as in a thermoforming operation.

Exemplary alkali metals and corresponding anions include alkali metal carbonates (e.g., lithium carbonate, sodium carbonate, and potassium carbonate), alkali metal hydroxides (e.g., lithium hydroxide, sodium hydroxide, and potassium hydroxide), and alkali metal acetates (e.g., lithium acetate, sodium acetate, and potassium acetate).

Exemplary alkaline earth metal cations and corresponding anions include alkaline earth metal carbonates (e.g., calcium carbonate, magnesium carbonate, strontium carbonate, and barium carbonate), alkaline earth metal hydroxide (e.g., calcium hydroxide, magnesium hydroxide, strontium hydroxide, and barium hydroxide), and alkaline earth metal acetate (e.g., calcium acetate, magnesium acetate, strontium acetate, and barium acetate).

In some embodiments, the alkali metal cation (e.g., lithium, sodium, and potassium) or alkaline earth metal cation (e.g., calcium, magnesium, strontium, and barium) is provided by using an alkali metal carbonate (e.g., lithium carbonate, sodium carbonate, and potassium carbonate), or alkaline earth metal carbonate (e.g., calcium carbonate, magnesium carbonate, strontium carbonate, and barium carbonate). In some embodiments, the alkali metal cation (e.g., lithium, sodium, and potassium) or alkaline earth metal cation (e.g., calcium, magnesium, strontium, and barium) is provided by using an alkali metal hydroxide (e.g., lithium hydroxide, sodium hydroxide, and potassium hydroxide) or alkaline earth metal hydroxide (e.g., calcium hydroxide, magnesium hydroxide, strontium hydroxide, and barium hydroxide). In some embodiments, the alkali metal cation (e.g., lithium, sodium, and potassium) or alkaline earth metal cation (e.g., calcium, magnesium, strontium, and barium) is provided by using an alkali metal acetate (e.g., lithium acetate, sodium acetate, and potassium acetate), or alkaline earth metal acetate (e.g., calcium acetate, magnesium acetate, strontium acetate, and barium acetate). In some embodiments, the alkali metal carbonate and alkaline earth metal carbonate is in the form of particles not greater than 1 micrometer (in some embodiments, not greater than 750 nm, 500 nm, 250 nm, or even not greater than 100 nanometers) in size.

In some embodiments of the light transparent fluoropolymer compositions or articles described herein, the fluoropolymer is at least one of PVDF (polyvinylidenefluoride), ETFE (polyethylene tetrafluoroethylene), or THV (terpolymer of polyvinylidefluoride, hexafluoropropylene, and tetrafluoroethylene), polytetrafluoroethylene, polychlorotetrafluoroethylene, or perfluoroalkoxy (PFA) polymer.

Some of the embodiments of light transparent fluoropolymer compositions described herein, comprising blends of the fluoropolymer with polymethylmethacrylate (PMMA).

Some of the embodiments of light transparent fluoropolymer compositions or articles described herein further comprise at least one ultraviolet light (UV) absorber.

Some of the embodiments of light transparent fluoropolymer compositions or articles described herein, further comprise at least one hindered amine light stabilizer (HALS) such as those available, for example, under the trade designations "TINUVIN 123" from BASF Corp., Florham Park, N.J.: "OMNISTAB LS292" from ICG Specialty Chemicals, Ultrecht, Netherlands: "OMNISTAB LS944" from ICG Specialty Chemicals: "SABOSTAB 119" and "SABOSTAB 94" from Sabo S.p.A., Levate BG, Italy; "UVINUL 4092" from BASF Corp., Florham Park, N.J.: "BLS 292" from Mayzo, Suwanee, Ga.: and "LOWILITE" from Addivant, Danbury, Conn.).

Some embodiments of light transparent fluoropolymer compositions or articles described herein further comprise at least one ultra-violet light absorber, infrared light absorber, hindered amine light stabilizer, or dye.

Some embodiments of light transparent fluoropolymer compositions or articles described herein further comprise at least one ultra-violet light reflector, visible light reflector, infrared light reflector, or pigment.

Polymer additives such as light stabilizers, antioxidants, alkali metal carbonates, and alkaline earth metal carbonates are typically extrusion blended with the fluoropolymers using a twin screw extruder having co-rotating, or counter rotating mixing elements to improve the dispersion uniformity of the additives in the polymer. Solid polymer pellets and additive powders can be pre-blended prior to extrusion with tumbling mixers. Another option is to feed the solid polymer pellets and polymer additive powders or polymer additive liquids separately into the throat of the extruder where the polymer pellets are melted and mixed with the polymer additives. Another option includes feeding the solid polymer pellets into the extruder and melting prior to the polymer additive being injected into the extruder via a downstream port in the extruder barrel. In some embodiments, the polymer additive is dissolved, or dispersed in water, and the aqueous dispersion is injected into a downstream extruder barrel port where the aqueous dispersion is mixed with the molten polymer and the water is evaporated out of another extruder port further downstream in the extruder barrel. In yet another embodiment, polymer pellets are spray coated with an aqueous solution of the desired polymer additive, and the water then evaporated off the solid polymer pellet leaving a thin coating of the polymer additive on the solid polymer pellet prior to extrusion. In yet another embodiment, solid polymer pellets are spray coated with an aqueous polymer additive solution using a fluidized bed process such as the Wurster spray coating process available under the trade designation "VFC-60" from Freund-Vector, Marion, Iowa. For highly transparent fluoropolymer films, it is desirable that the polymer additive either be soluble in the fluoropolymer or at least dispersed uniformly into very small particles (in some embodiments, less than 500 nm in diameter, less than 200 nm, or even less than 100 nm in diameter).

Useful forms of light transparent fluoropolymer compositions described herein include films, sheeting, and tubing. Exemplary forms of articles described herein include surface structured anti-reflective films, UV protective overlay films, and tapes.

Referring to FIG. 1, exemplary embodiment 100 fluoropolymer film 101 comprises at least one of alkali metal cation, alkali metal and a corresponding anion, alkaline earth metal, or alkaline earth metal cation and a corresponding anion.

Figure 2:
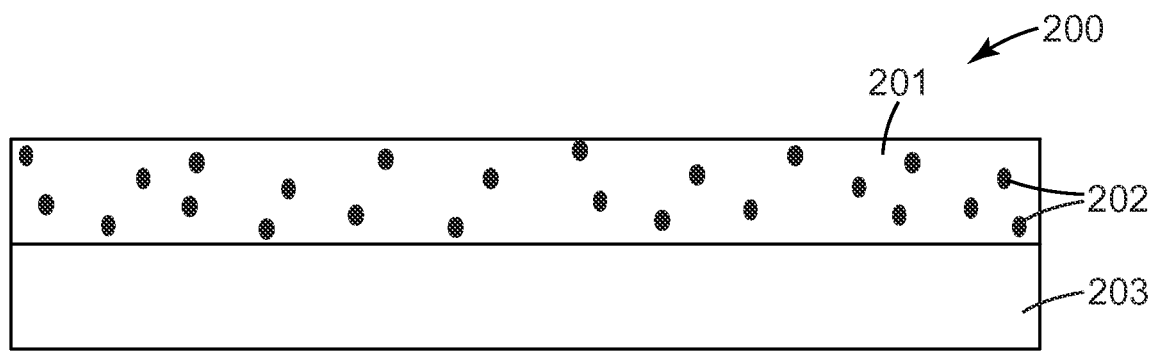
FIG. 2 is a cross-sectional view of an exemplary fluoropolymer film with an adhesive layer described herein.

Referring to FIG. 2, exemplary embodiment 200 fluoropolymer film 201 comprises at least one of alkali metal cation, alkali metal and a corresponding anion, alkaline earth metal, or alkaline earth metal cation and a corresponding anion 202 and an adhesive layer 203.

Figure 3:
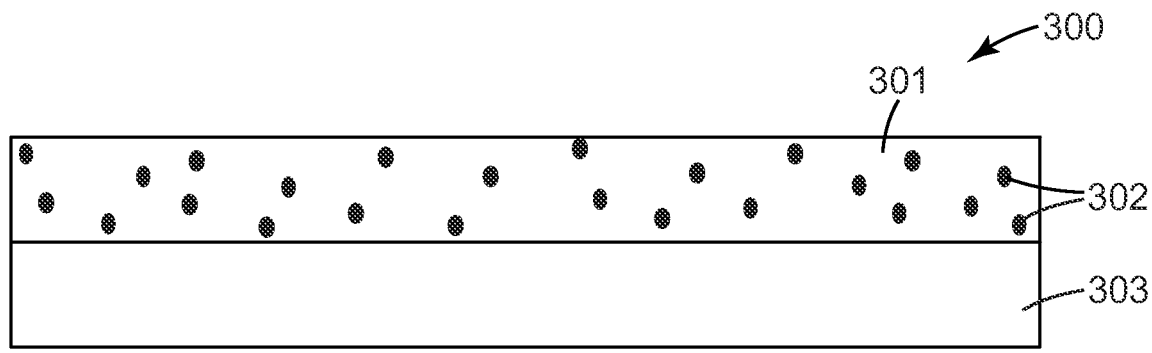
FIG. 3 is a cross-sectional view of an exemplary multilayer fluoropolymer film described herein.

Referring to FIG. 3, exemplary embodiment multilayer film 300 comprises fluoropolymer layer (e.g., film) 301 in turn at least one of alkali metal cation, alkali metal and a corresponding anion, alkaline earth metal, or alkaline earth metal cation and a corresponding anion 302, and another polymer layer 303 (e.g., polymethylmethacrlyate, polymethylmethacrylate copolymer, ethylene vinyl acetate).

Multilayer optical films described herein can be made using the general processing techniques, such as those described in U.S. Pat. No. 6,783,349 (Neavin et al.), the disclosure of which is incorporated herein by reference.

Techniques for providing a multilayer optical film with a controlled reflection spectrum include the use of an axial rod heater control of the layer thickness values of coextruded polymer layers as described, for example, in U.S. Pat. No. 6,783,349 (Neavin et al.); timely layer thickness profile feedback during production from a layer thickness measurement tool (e.g., an atomic force microscope (AFM), a transmission electron microscope, or a scanning electron microscope); optical modeling to generate the desired layer thickness profile; and repeating axial rod adjustments based on the difference between the measured layer profile and the desired layer profile.

A basic process for layer thickness profile control involves adjustment of axial rod zone power settings based on the difference of the target layer thickness profile and the measured layer profile. The axial rod power increase needed to increase or decrease the polymer flow to adjust the layer thickness values in a given feedblock zone may first be calibrated in terms of watts of heat input per nanometer of resulting thickness change of the layers generated in that heater zone. For example, fine control of the spectrum is possible using 24 axial rod zones for 275 layers. Once calibrated, the necessary power adjustments can be calculated once given a target profile and a measured profile. The procedure is repeated until the two profiles converge.

The layer thickness profile (layer thickness values) of multi-layer optical films described herein reflecting at least 50 percent of incident UV light over a specified wavelength range can be adjusted to be approximately a linear profile with the first (thinnest) optical layers adjusted to have about a ¼ wave optical thickness (index times physical thickness) for 300 nm light and progressing to the thickest layers which can be adjusted to be about ¼ wave thick optical thickness for 400 nm light. Using the same method, layer thicknesses in multi-layer optical films reflecting UV and blue light can be adjusted to be approximately linear in thickness profile with the first (thinnest) optical layers adjusted to have about a ¼ wave optical thickness (index times physical thickness) for 300 nm light and progressing to the thickest layers which would be adjusted to be about ¼ wave thick optical thickness for 500 nm light. In another embodiment, the layer thickness profile (layer thickness values) of multi-layer optical film described herein reflecting at least 50 percent of incident infrared light over a specified wavelength range can be adjusted to be approximately linear in thickness profile with the first (thinnest) optical layers adjusted to have about a ¼ wave optical thickness (index times physical thickness) for 800 nm light and progressing to the thickest layers which can be adjusted to be about ¼ wave thick optical thickness for 1200 nm light.

Some embodiments of multi-layer optical films described herein have a UV transmission band edge in a range from 10 to 90 percent transmission spanning less than 20 (in some embodiments, less than 10) nanometers.

Exemplary thicknesses of multi-layer optical films described herein have a thickness in a range from 25 micrometers to 250 micrometers. Exemplary thicknesses of optical layers (e.g., the third optical layer) that absorb have a collective thickness in a range from 10 micrometers to 200 micrometers.

Exemplary polymers, for the optical layers, especially for use in the high refractive index layer, include homopolymers of polymethylmethacrylate (PMMA), such as those available from Ineos Acrylics, Inc., Wilmington, Del., under the trade designations "CP71" and "CP80;" and polyethyl methacrylate (PEMA), which has a lower glass transition temperature than PMMA. Additional useful polymers include copolymers of PMMA (CoPMMA), such as a CoPMMA made from 75 wt. % methylmethacrylate (MMA) monomers and 25 wt. % ethyl acrylate (EA) monomers, (available from Ineos Acrylics, Inc., under the trade designation "PERSPEX CP63" or Arkema under the trade designation "ATOGLAS 510"), a CoPMMA formed with MMA comonomer units and n-butyl methacrylate (nBMA) comonomer units, or a blend of PMMA and poly(vinylidene fluoride) (PVDF).

Additional suitable polymers for the optical layers, especially for use in the high refractive index layer, include polyolefin copolymers such as poly (ethylene-co-octene) (PE-PO) available from Dow Elastomers, Midland, Mich., under the trade designation "ENGAGE 8200" and poly (propylene-co-ethylene) (PPPE) available from Atofina Petrochemicals, Inc., Houston, Tex., under the trade designation "Z9470." The multilayer optical films can also include, for example, in the second optical layers, a functionalized polyolefin, such as linear low density polyethylene-graft-maleic anhydride (LLDPE-g-MA) such as that available from E.I. duPont de Nemours & Co., Inc., Wilmington, Del., under the trade designation "BYNEL 4105."

In some embodiments, the composition described herein is present in one or more optical layers. In some embodiments, there are a plurality of layers (e.g., at least first or second optical layers), where at least one layer comprises a fluoropolymeric material. In some embodiments, both a first and the second optical layers comprise a fluoropolymeric material. The fluoropolymeric materials contemplated by this disclosure include melt-processible fluoropolymers derived from interpolymerized units of fully or partially fluorinated monomers and may be semi-crystalline or amorphous. The fluoropolymeric material may include at least one of the following monomers: tetrafluoroethylene (TFE), vinylidene fluoride (VDF), vinyl fluoride (VF), hexafluoropropylene (HFP), chlorotrifluoroethylene (CTFE), fluoroalkyl vinyl ethers, fluoroalkoxy vinyl ethers, fluorinated styrenes, fluorinated siloxanes, or hexafluoropropylene oxide (HFPO).

Exemplary fluoropolymeric material include: homopolymers of TFE (e.g., PTFEs), copolymers of ethylene and TFE copolymers (e.g., ETFEs); copolymers of TFE, HFP, and VDF (e.g., THVs); homopolymers of VDF (e.g., PVDFs); copolymers of VDF (e.g., coVDFs); homopolymers of VF (e.g., PVFs); copolymers of HFP and TFE (e.g., FEPs); copolymers of TFE and propylene (e.g., TFEPs); copolymers of TFE and (perfluorovinyl) ether (e.g., PFAs); copolymers of TFE, (perfluorovinyl) ether, and (perfluoromethyl vinyl) ether (e.g., MFAs); copolymers of HFP, TFE, and ethylene (e.g., HTEs); homopolymers of chlorotrifluoroethylene (e.g., PCTFE); copolymers of ethylene and CTFE (e.g., ECTFEs); homopolymers of HFPO (e.g., PHFPO); homopolymers of 4-fluoro-(2-trifluoromethyl)styrene; copolymers of TFE and norbornene; or copolymers of HFP and VDF.

In some embodiments, the representative melt-processible copolymers described above include additional monomers, which may be fluorinated or non-fluorinated. Examples include: ring opening compounds such as 3- or 4-membered rings that undergo ring opening under the conditions of polymerization such as, e.g., epoxides; olefinic monomers such as propylene, ethylene, vinylidene fluoride, vinyl fluoride, and norbornene; and perfluoro(vinyl ether)s of the formula $CF_2=CF—(OCF_2CF(R_f))_aOR'_f$ where $R_f$ is a perfluoroalkyl having 1 to 8, typically 1 to 3, carbon atoms, $R'_f$ is a perfluoroaliphatic, typically perfluoroalkyl or perfluoroalkoxy, of 1 to 8, typically 1 to 3, carbon atoms, and a is an integer from 0 to 3. Examples of the perfluoro(vinyl ether)s having this formula include: $CF_2=CFOCF_3$, $CF_2=CFOCF_2CF_2CF_2OCF_3$, $CF_2=CFOCF_2CF_2CF_3$, $CF_2=CFOCF_2CF(CF_3)OCF_2CF_2CF_3$, and $CF_2=CFOCF_2CF(CF_3)OCF_2CF(CF_3)OCF_2CF_2CF_3$. Particularly useful may be melt-processible fluoropolymers comprising at least three, or even at least four, different monomers.

The fluoropolymeric material can be semi-crystalline or amorphous in nature. For example, depending on the ratio of TFE, HFP, and VDF, the fluoropolymeric material can be semi-crystalline or amorphous. See Arcella, V. and Ferro R. in Modern Fluoroplastics, Scheirs., J., ed., John Wiley and Sons, N Y, 1997, p. 77 for further discussion.

Exemplary melt-processible copolymers of tetrafluoroethylene and other monomer(s) discussed above include those commercially available as: copolymers of tetrafluoroethylene, hexafluoropropylene, and vinylidene fluoride sold under the trade designation "DYNEON THV 220", "DYNEON THV 230", "DYNEON THV 500", "DYNEON THV 500G", "DYNEON THV 510D", "DYNEON THV 610", "DYNEON THV 815", "DYNEON THVP 2030G" by Dyneon LLC, Oakdale, Minn.; copolymers of tetrafluoroethylene, hexafluoropropylene, and ethylene sold under the trade designation "DYNEON HTE 1510" and "DYNEON HTE 1705" by Dyneon LLC, and "NEOFLON EFEP" by Daikin Industries, Ltd., Osaka, Japan; copolymers of tetrafluoroethylene, hexafluoropropylene, and ethylene sold under the trade designation "AFLAS" by Asahi Glass Co., Ltd., Tokyo, Japan; copolymers of tetrafluoroethylene and norbornene sold under the trade designation "TEFLON AF" by E.I. du Pont de Nemours and Co., Wilmington, Del.; copolymers of ethylene and tetrafluoroethylene sold under the trade designation "DYNEON ET 6210A" and "DYNEON ET 6235" by Dyneon LLC, "TEFZEL ETFE" by E.I. du Pont de Nemours and Co., and "FLUON ETFE" by Asahi Glass Co., Ltd.; copolymers of ethylene and chlorotrifluoroethylene sold under the trade designation "HALAR ECTFE" by Solvay Specialty Polymers, Brussels, Belgium; homopolymers of vinylidene fluoride sold under the trade designation "DYNEON PVDF 1008" and "DYNEON PVDF 1010" by Dyneon LLC; copolymers of polyvinylidene fluoride sold under the trade designation "DYNEON PVDF 11008", "DYNEON PVDF 60512", "DYNEON FC-2145" (a copolymer of HFP and VDF) by Dyneon LLC; homopolymers of vinyl fluoride sold under the trade designation "DUPONT TEDLAR PVF" by E.I. du Pont de Nemours and Co.; MFAs sold under the trade designation "HYFLON MFA" by Solvay Specialty Polymers; and combinations thereof.

In some embodiments, a UV stable substrate comprises a multi-layer optical film comprising a first plurality of at least first and second optical layers having a major surface and collectively reflecting at least 50 (in some embodiments, at least 55, 60, 65, 70, 75, 80, 85, 90, 95, 96, 97, or even at least 98) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers, and a third optical layer having first and second generally opposed first and second major surfaces and collectively absorbing at least 50 (in some embodiments, at least 55, 60, 65, 70, 75, 80, 85, 90, or even at least 95) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers, wherein the major surface of the plurality of first and second optical layers is proximate (i.e., within 1 mm, in some embodiments, not more than 0.75 mm, 0.5 mm, 0.4 mm, 0.3 mm, 0.25 mm, 0.2 mm, 0.15 mm, 0.1 mm, or even within 0.05 mm; in some embodiments, contacting) to the first major surface of the third optical layer, and wherein there is a second plurality of first and second optical layers having a major surface and collectively reflecting at least 50 (in some embodiments, at least 55, 60, 65, 70, 75, 80, 85, 90, 95, 96, 97, or even at least 98) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers proximate (i.e., within 1 mm, in some embodiments, not more than 0.75 mm, 0.5 mm, 0.4 mm, 0.3 mm, 0.25 mm, 0.2 mm, 0.15 mm, 0.1 mm, or even within 0.05 mm; in some embodiments, contacting) to the second major surface of the third optical layer. Optionally, at least some of the first and/or second layers (in some embodiments at least 50 percent by number of the first and/or second layers, in some embodiments all of at least one of the first or second layers) comprise a UV absorber.

Exemplary UV stable substrates can be formed by coextrusion of UV stable skin layers (e.g., PVDF (polyvinylidenefluroide)/UVA(ultraviolet absorber), blends of PMMA (polymethylmethacrylate) and PVDF (polyvinylidene fluoride)/UVA(ultraviolet absorber) and PMMA (polymethylmethacryate)/UVA(ultraviolet absorber)). Alternatively, UV stable skin layers can be laminated or adhered to less UV stable layers. Thicknesses of the UV stable skin layers relative to the core layer can be varied to optimize properties such as UV stability, ductility, toughness, hardness, and other desirable physical properties.

In some embodiments, a multi-layer optical film comprises a plurality of at least first and second optical layers having opposing first and second major surfaces and collectively reflecting at least 50 (in some embodiments, at least 55, 60, 65, 70, 75, 80, 85, 90, 95, 96, 97, or even at least 98) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers, a third optical layer having a major surface and absorbing at least 50 (in some embodiments, at least 55, 60, 65, 70, 75, 80, 85, 90, or even at least 95) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers proximate (i.e., within 1 mm, in some embodiments, not more than 0.75 mm, 0.5 mm, 0.4 mm, 0.3 mm, 0.25 mm, 0.2 mm, 0.15 mm, 0.1 mm, or even within 0.05 mm; in some embodiments, contacting) to the first major surface of the plurality of at least first and second optical layers, and a fourth optical layer absorbing at least 50 (in some embodiments, at least 55, 60, 65, 70, 75, 80, 85, 90, or even at least 95) percent of incident UV light over at least a 30 (in some embodiments, at least 35, 40, 45, 50, 55, 60, 65, 70, 75, 80, 85, 90, 95, or even at least 100) nanometer wavelength range in a wavelength range from at least 300 nanometers to 400 nanometers proximate (i.e., within 1 mm, in some embodiments, not more than 0.75 mm, 0.5 mm, 0.4 mm, 0.3 mm, 0.25 mm, 0.2 mm, 0.15 mm, 0.1 mm, or even within 0.05 mm; in some embodiments, contacting) to the second major surface of the plurality of at least first and second optical layers. Optionally, at least some of the first and/or second layers (in some embodiments at least 50 percent by number of the first and/or second layers, in some embodiments all of at least one of the first or second layers) comprise a UV absorber.

In some embodiments, alternating first and second layers of a multilayer optical films have a difference in refractive index of at least 0.04 (in some embodiments, at least 0.05, 0.06, 0.07, 0.08, 0.09, 0.1, 0.125, 0.15, 0.175, 0.2, 0.225, 0.25, 0.275, or even at least 0.3). In some embodiments, the first optical layer is birefringent and comprises a birefringent polymer. In some embodiments, at least one of the first, second, or third (if present) optical layer is at least one of fluoropolymer, silicone polymer, urethane polymer, or acrylate polymer (including blends thereof), and preferably is UV stable.

Preferred material combinations for making the optical layers that reflect UV light (e.g., the first and second optical layers) include PMMA (e.g., first layer)/THV (e.g., second layer), COC(e.g., first layer)/THV (e.g., second layer), EVA (e.g., first layer)/THV (e.g., second layer), COC(e.g., first layer)/PVDF(e.g., second layer), EVA(e.g., first layer)/PVDF (e.g., second layer), (PMMA (e.g., first layer)/PVDF (e.g., second layer), CoPMMA (e.g., first layer)/PVDF (e.g., second layer), PVDF/PMMA blend (e.g., first layer)/PVDF (e.g., second layer), and PVDF/PMMA blend (e.g., first layer/THV (e.g. second layer).

Exemplary materials for making the optical layers that absorb UV light (e.g., the third optical layer) include fluoropolymers, urethane polymers, acrylate polymers, PC, PMMA, CoPMMA, or blends of PMMA and PVDF, and a UV absorber.

In some embodiments, a UV filter (protective) layer is a multilayer optical film that reflects wavelengths of light from about 350 nm to about 400 nm, (in some embodiments from 300 nm to 400 nm). In these embodiments, the polymers for the UV absorbing layer preferably do not absorb UV light in the 300 nm to 400 nm range. Examples of the materials that are desirable for such embodiments include PMMA/THV, PMMA/PVDF, COC/PVDF, modified polyolefin copolymers (EVA) with THV, EVA/PVDF, and EVA/ blends of PVDF/PMMA. In one exemplary embodiment, THV available under the trade designation "DYNEON THV 220 GRADE" and "DYNEON THV 2030 GRADE" from Dyneon LLC, Oakdale, Minn., are employed with PMMA for multilayer UV mirrors reflecting 300-400 nm.

UV-reflective multilayer optical film can be made, for example, with first optical layers created from PMMA available, for example, under the trade designation "PLEXIGLAS VO44" from Arkema, Inc. and second optical layers created from a copolymer of tetrafluoroethylene available, for example, under the trade designation "THVP 2030" from Dyneon, LLC. PMMA and THV would be coextruded through a multilayer polymer melt manifold to create a multilayer melt stream having 550 alternating first and second optical layers. The layer thickness profile (layer thickness values) of this UV reflector would be adjusted to be approximately a linear profile with the first (thinnest) optical layers adjusted to have about a ¼ wave optical thickness (index times physical thickness) for 300 nm light and progressing to the thickest layers which would be adjusted to be about ¼ wave thick optical thickness for 400 nm light. Layer thickness profiles of such films can be adjusted to provide for improved spectral characteristics using the axial rod apparatus taught in combined with layer profile information obtained with microscopic techniques described previously.

In addition to the first and second optical layers, a pair of PMMA non-optical layers would be coextruded as protective skin layers on either side of the optical layer stack. These PMMA optical layers and skin layers would be extrusion compounded with 5 weight percent of a UV absorber available, for example, under the trade designation "TINUVIN 1600" from BASF Corporation, Florham Park, N.J., and 0.1 percent HALS available, for example, under the trade designation "CHIMASSORB 944" from BASF Corporation. This multilayer coextruded melt stream would be cast vertically downward onto a chilled roll (20-50° C.) at 22 meters per minute creating a multilayer cast web approximately 300 micrometers (12 mils) thick. The multilayer cast web would then be heated in a tenter oven at 135° C. for 10 seconds prior to being biaxially oriented to a draw ratio of 2.0×2.0.

IR-reflective multilayer optical film can be made with first optical layers created from PMMA available, for example, under the trade designation "PLEXIGLAS VO44" from Arkema, Inc. and second optical layers created from a copolymer of tetrafluoroethylene available, for example, under the trade designation "THVP 2030" from Dyneon, LLC. The PMMA and THV would be coextruded through a multilayer polymer melt manifold to create a multilayer melt stream having 550 alternating first and second optical layers. The layer thickness profile (layer thickness values) of this UV reflector would be adjusted to be approximately a linear profile with the first (thinnest) optical layers adjusted to have about a ¼ wave optical thickness (index times physical thickness) for 800 nm light and progressing to the thickest layers which would be adjusted to be about ¼ wave thick optical thickness for 1200 nm light. Layer thickness profiles of such films can be adjusted to provide for improved spectral characteristics using the axial rod apparatus taught in combined with layer profile information obtained with microscopic techniques described previously.

In addition to the first and second optical layers, a pair of PMMA non-optical layers would be coextruded as protective skin layers on either side of the optical layer stack. These PMMA optical layers and skin layers would be extrusion compounded with 5 weight percent of a UV absorber available, for example, under the trade designation "TINUVIN 1600" from BASF Corporation and 0.1 percent HALS available, for example, under the trade designation "CHIMMASORB 944" from BASF Corporation. This multilayer coextruded melt stream would be cast onto a chilled roll (20-50° C.) at 22 meters per minute creating a multilayer cast web approximately 600 micrometers (24 mils) thick. The multilayer cast web would then be heated in a tenter oven at 135° C. for 10 seconds prior to being biaxially oriented to a draw ratio of 2.0×2.0.

Figure 4:
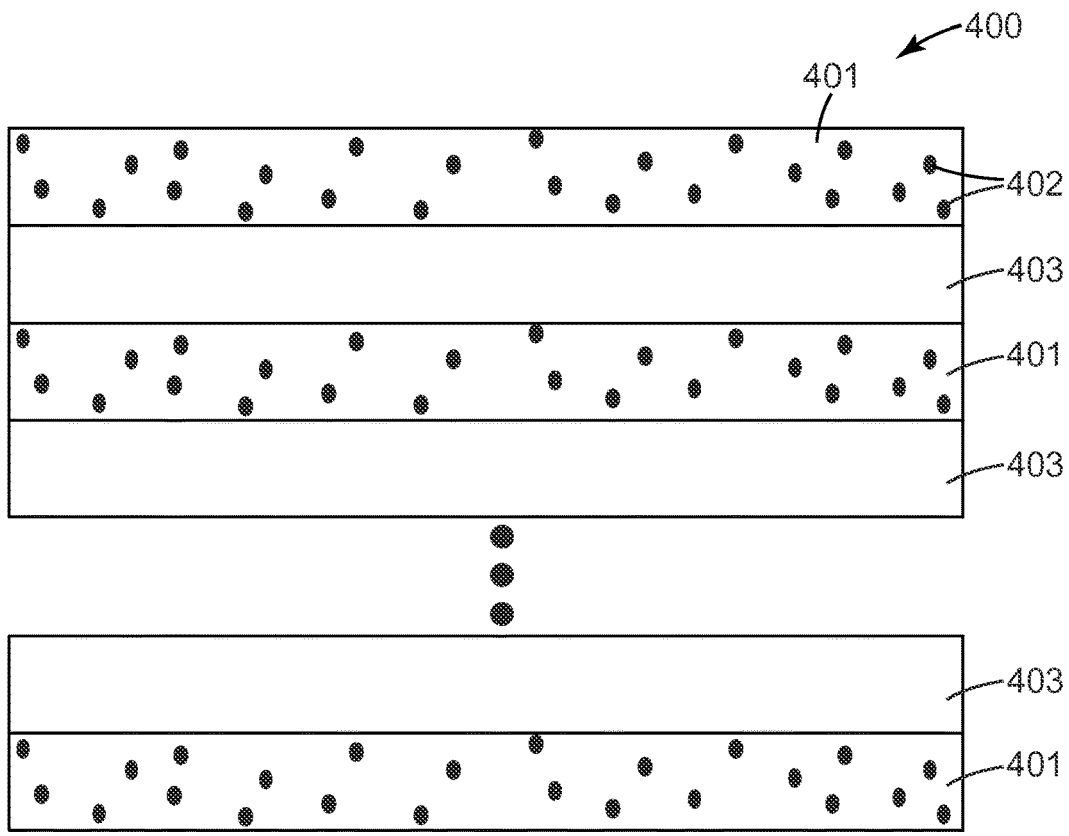
FIG. 4 is a cross-sectional view of an exemplary multilayer optical film comprising hundreds of alternating layers of fluoropolymer with hundreds of alternating layers of another polymer. Not all layers are shown.

Referring to FIG. 4, exemplary multilayer optical film 400 comprises fluoropolymer layer 401 which in turn comprises at least one alkali metal (e.g., lithium, sodium, and potassium) cation, alkali metal (e.g., lithium, sodium, and potassium) and a corresponding anion (e.g., $CO_3$, OH, $OOCCH_3$), alkaline earth metal cation (e.g., calcium, magnesium, strontium, and barium), or alkaline earth metal cation (e.g., calcium, magnesium, strontium, and barium) and a corresponding anion (e.g., $CO_3$, OH, $OOCCH_3$), 402, and alternating layers 403 of a second optical polymer.

A variety of optional additives may be incorporated into an optical layer to make it UV absorbing. Examples of such additives include at least one of an ultra violet absorber(s), a hindered amine light stabilizer(s), or an anti-oxidant(s) thereof.

Exemplary UV absorbers are red shifted ultraviolet absorbers (RUVA's) which absorb at least 70% (in some embodiments, at least 80%, or even greater than 90% of the UV light in the wavelength region from 180 nm to 400 nm. Typically, it is desirable that the RUVA is highly soluble in the polymers, highly absorptive, photo-permanent and thermally stable in the temperature range from 200° C. to 300° C. for the extrusion process to form the protective layer. The RUVA can also be highly suitable if they can be copolymerizable with monomers to form protective coating layer by UV curing, gamma ray curing, electron beam curing, or thermal curing processes.

RUVA's typically have enhanced spectral coverage in the long-wave UV region, enabling it to block the high wavelength UV light that can cause yellowing in polyesters. Typical UV protective layers have thicknesses in a range from 13 micrometers to 380 micrometers (0.5 mil to 15 mil) with a RUVA loading level of 2-10% by weight. One of the most effective RUVA's is a benzotriazole compound, 5-trifluoromethyl-2-(2-hydroxy-3-alpha-cumyl-5-tert-octylphenyl)-2H-benzotriazole (sold under the trade designation "CGL-0139" from BASF Corporation Florham Park, N.J.). Other preferred benzotriazoles include 2-(2-hydroxy-3,5-di-alpha-cumylphenol)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenol)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole. Further preferred RUVA includes 2-(4,6-diphenyl-1-3,5-triazin-2-yl)-5-hexyloxy-phenol. Exemplary UV absorbers include those available from BASF Corporation under the trade designations "TINUVIN 1600", "TINUVIN 1577," "TINUVIN 900," and "TINUVIN 777." Other exemplary UV absorbers are available in a PMMA (polymethylmethacrylate) master batch from Sukano Polymers Corporation, Duncan, S.C., under the trade designation "TA11-10 MB03." An exemplary UV absorber for polycarbonate is a masterbatch from Sukano Polymers Corporation, Duncan, S.C., under the trade designations "TA28-09 MBO1." In addition, the UV absorbers can be used in combination with hindered amine light stabilizers (HALS) and anti-oxidants. Exemplary HALS include those available from BASF Corporation under the trade designation "CHIMASSORB 944" and "TINUVIN 123." Exemplary anti-oxidants include those obtained under the trade designations "IRGANOX 1010" and "ULTRANOX 626", also available from BASF Corporation.

Fluoropolymer compatible copolymerized UVAs are particularly desirable. Copolymers according to the present disclosure in any of their embodiments include a first divalent unit comprising a pendent ultraviolet absorbing (UVA) group. Any class of UVA may be useful for providing the UVA group. Examples of useful classes include benzophenones, benzotriazoles, triazines, cinnamates, cyanoacrylates, dicyano ethylenes, salicylates, oxanilides, and para-aminobenzoates. In some embodiments, the pendent ultraviolet absorbing group comprises a triazine, a benzophenone, or a benzotriazole. In some embodiments, the pendent ultraviolet absorbing group is a triazine. In some embodiments, the pendent ultraviolet absorbing group has enhanced spectral coverage in the long-wave UV region (e.g., 315 nm to 400 nm), enabling it to block the high wavelength UV light that can cause yellowing in polymers. The first divalent unit can be considered to be a repeating unit in the copolymer disclosed herein. The first divalent unit may be represented by formula—[—$CH_2$—C(H)UVA-]—, —[—$CH_2$—C(H)C(O)—O—X-UVA-]—, —[—$CH_2$—C(H)C(O)—NH—X-UVA-]—, —[—$CH_2$—C($CH_3$)C(O)—O—X-UVA-]—, or —[—$CH_2$—C($CH_3$)C(O)—NH—X-UVA-]—, wherein X is an alkylene or alkyleneoxy group having from 1 to 10 (in some embodiments, 2 to 6 or 2 to 4) carbon atoms and optionally interrupted by one or more —O— groups and optionally substituted by a hydroxyl group, and wherein UVA includes any of the above embodiments of UVA groups. In the alkyleneoxy group, the oxygen is attached to the UVA group. The copolymer may include (e.g., at least 2, 3, 4, 5, 6, 7, 8, 9, 10, 15, or at least 20 up to 30, 35, 40, 45, 50, 100, or up to 200) of these repeating units. The repeating unit can be derived from a substituted vinyl, substituted acrylate, or substituted methacrylate group.

In some embodiments, the first divalent unit is represented by formula:

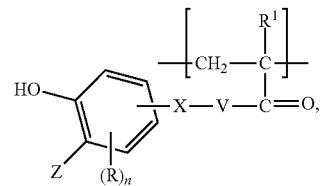

wherein $R^1$ is hydrogen or methyl, V is O or NH, X is alkylene or alkyleneoxy group having from 1 to 10 (in some embodiments, 2 to 6 or 2 to 4) carbon atoms and optionally interrupted by one or more —O— groups and optionally substituted by a hydroxyl group, R is alkyl (e.g., having from one to four carbon atoms), n is 0 or 1, and Z is a benzoyl group, a 4,6-bisphenyl[1,3,5]triazin-2-yl group, or a 2H-benzotriazol-2-yl group, wherein the benzoyl group, 4,6-bisphenyl[1,3,5]triazin-2yl group, and 2H-benzotriazol2-yl group is optionally substituted by one or more alkyl, aryl, alkoxy, hydroxyl, or halogen substituents, or a combination of these substituents. In some embodiments, the alkyl and/or alkoxy substituent independently has 1 to 4 or 1 to 2 carbon atoms. In some embodiments, each halogen substituent is independently a chloro, bromo, or iodo group. In some embodiments, each halogen substituent is a chloro group. The term "aryl" as used herein includes carbocyclic aromatic rings or ring systems, for example, having 1, 2, or 3 rings and optionally containing at least one heteroatom (e.g., O, S, or N) in the ring. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl. In the alkyleneoxy group, the oxygen is attached to the substituted benzene ring. In some embodiments, each V is O and X is ethylene, propylene, butylene, ethyleneoxy, propyleneoxy, or butyleneoxy, with the oxygen attached to the substituted benzene ring. In some embodiments, n is 0. In some embodiments, R is methyl, ethyl, n-propyl, isopropyl, n-butyl, isobutyl, s-butyl, or t-butyl, and n is 1. In some embodiments, Z is an unsubstituted benzoyl group. In some embodiments, Z is 4,6-bis(2,4-dimethylphenyl)[1,3,5]triazin-2-yl; 4,6-bis(2,4-diethylphenyl)[1,3,5]triazin-2-yl; 4,6-bis(2,4-dimethoxyphenyl)[1,3,5]triazin-2-yl; or 4,6-bis(2, 4-diethoxyphenyl)[1,3,5]triazin-2-yl. In some embodiments, Z is 2H-benzotriazol-2-yl or 5-chloro-2H-benzotriazol-2-yl.

Copolymers disclosed herein in any of their embodiments include (e.g., at least 1, 2, 3, 4, 5, 6, 7, 8, 9, 10, 15, or at least 20 up to 30, 35, 40, 45, 50, 100, or up to 200) second divalent units independently represented by formula:

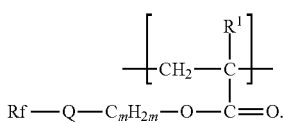

For divalent units having this formula, Q is a bond, —SO$_2$N(R)—, or —C(O)—N(R)— wherein R is alkyl having 1 to 4 carbon atoms (e.g., methyl, ethyl, n-propyl, isopropyl, n-butyl, or isobutyl) or hydrogen. In some embodiments, Q is a bond. In some embodiments, Q is —SO$_2$N(R)—. In some of these embodiments, R is methyl or ethyl. m is an integer from 1 to 11 (i.e., 1, 2, 3, 4, 5, 6, 7, 8, 9, 10, or 11). In some of these embodiments, m is 1; in other of these embodiments, m is 2. In some embodiments wherein Q is —SO$_2$N(R)—, m is an integer from 2 to 11, 2 to 6, or 2 to 4. In some embodiments wherein Q is a bond, m is an integer from 1 to 6, 1 to 4, or 1 to 2. In embodiments wherein Q is a bond, it should be understood that the second divalent units may also be represented by formula:

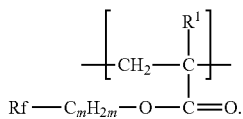

In some embodiments, copolymers disclosed herein, including any of the embodiments described above in connection to the first divalent units, comprise (e.g., at least 2, 3, 4, 5, 6, 7, 8, 9, 10, 15, or at least up to 2 0 30, 35, 40, 45, 50, 100, or up to 200) second divalent units independently represented by formula:

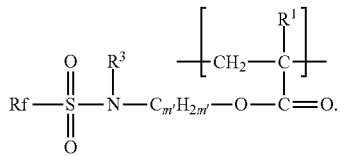

For divalent units of this formula, m' is an integer from 2 to 11 (i.e., 2, 3, 4, 5, 6, 7, 8, 9, 10, or 11). In some embodiments, m' is an integer from 2 to 6 or 2 to 4. $R^3$ is alkyl having 1 to 4 carbon atoms (e.g., methyl, ethyl, n-propyl, isopropyl, n-butyl, or isobutyl) or hydrogen. In some embodiments, $R^3$ is methyl or ethyl.

For any of the embodiments of the second divalent units, each Rf independently represents a fluorinated alkyl group having from 1 to 6 (in some embodiments, 2 to 6 or 2 to 4) carbon atoms (e.g., trifluoromethyl, perfluoroethyl, 1,1,2,2-tetrafluoroethyl, 2-chlorotetrafluoroethyl, perfluoro-n-propyl, perfluoroisopropyl, perfluoro-n-butyl, 1,1,2,3,3,3-hexafluoropropyl, perfluoroisobutyl, perfluoro-sec-butyl, or perfluoro-tert-butyl, perfluoro-n-pentyl, pefluoroisopentyl, or perfluorohexyl). In some embodiments, Rf is perfluorobutyl (e.g., perfluoro-n-butyl, perfluoroisobutyl, or perfluoro-sec-butyl). In some embodiments, Rf is perfluoropropyl (e.g., perfluoro-n-propyl or perfluoroisopropyl). The copolymer may include a mixture of fluorinated monomers having different Rf fluoroalkyl groups (e.g., with an average of up to 6 or 4 carbon atoms).

In some embodiments, in copolymers disclosed herein, including any of the embodiments described above in connection to the first divalent units, Rf is a polyfluoropolyether group. The term "polyfluoroether" refers to a compound or group having at least 3 (in some embodiments, at least 4, 5, 6, 7, 8, 9, 10, 11, 12, 13, 14, 15, 16, 17, 18, 19, or even 20) carbon atoms and at least 1 (in some embodiments, at least 2, 3, 4, 5, 6, 7, or even 8) ether linkages, wherein hydrogen atoms on the carbon atoms are replaced with fluorine atoms. In some embodiments, Rf has up to 100, 110, 120, 130, 140, 150, or even 160 carbon atoms and up to 25, 30, 35, 40, 45, 50, 55, or even 60 ether linkages.

In some embodiments, including embodiments wherein Rf is a polyfluoroether group, copolymers according to the present disclosure comprise (e.g., at least 2, 3, 4, 5, 6, 7, 8, 9, 10, 15, or at least 20 up 30, 35, 40, 45, 50, 100, or up to 200) second divalent units independently represented by formula:

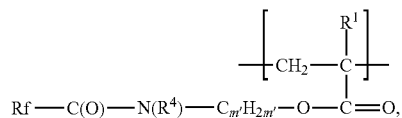

For divalent units of this formula, m' is an integer from 2 to 11 (i.e., 2, 3, 4, 5, 6, 7, 8, 9, 10, or 11). In some embodiments, m' is an integer from 2 to 6 or 2 to 4. $R^4$ is alkyl having 1 to 4 carbon atoms (e.g., methyl, ethyl, n-propyl, isopropyl, n-butyl, or isobutyl) or hydrogen. In some embodiments, $R^4$ is methyl or ethyl. In some embodiments, $R^4$ is hydrogen.

The polyfluoroether group Rf can be linear, branched, cyclic, or combinations thereof and can be saturated or unsaturated. Polyfluoroether groups include those in which hydrogen or chlorine atoms are present instead of fluorine atoms with typically up to one atom of either hydrogen or chlorine is present for every two carbon atoms. The copolymer may include a mixture of fluorinated monomers having different Rf polyfluoroether groups. In some embodiments, the polyfluoroether group is a perfluoropolyether group (i.e., all of the hydrogen atoms on the carbon atoms are replaced with fluorine atoms). Exemplary perfluoropolyethers include perfluorinated repeating units represented by at least one of —(C$_d$F$_{2d}$)—, —(C$_d$F$_{2d}$O)—, —(CF(L'))—, —(CF(L')O)—, —(CF(L')C$_d$F$_{2d}$O)—, —(C$_d$F$_{2d}$CF(L')O)—, or —(CF$_2$CF(L')O)—. In these repeating units, d is typically an integer from 1 to 10. In some embodiments, d is an integer from 1 to 8, 1 to 6, 1 to 4, or 1 to 3. The L' group can be a perfluoroalkyl group optionally interrupted by at least one ether linkage or a perfluoroalkoxy group, each of which may be linear, branched, cyclic, or a combination thereof. The L' group typically has up to 12 (in some embodiments, up to 10, 8, 6, 4, 3, 2, or 1) carbon atoms. In some embodiments, the L' group can have up to 4 (in some embodiments, up to 3, 2, or 1) oxygen atoms; in some embodiments L' has no oxygen atoms. In these perfluoropolyether structures, different repeating units can be combined in a block or random arrangement to form the Rf group.

In some embodiments, Rf is represented by formula R$_f^a$—O—(R$_f^b$—O—)$_z$(R$_f^c$)—, wherein R$_f^a$ is a perfluoroalkyl having 1 to 10 (in some embodiments, 1 to 6, 1 to 4, 2 to 4, or 3) carbon atoms; each R$_f^b$ is independently a perfluoroalkylene having 1 to 4 (i.e., 1, 2, 3, or 4) carbon atoms; R$_f^c$ is a perfluoroalkylene having 1 to 6 (in some embodiments, 1 to 4 or 2 to 4) carbon atoms; and z' is in a range from 2 to 50 (in some embodiments, 2 to 25, 2 to 20, 3 to 20, 3 to 15, 5 to 15, 6 to 10, or 6 to 8). Representative R$_f^a$ groups include CF$_3$—, CF$_3$CF$_2$—, CF$_3$CF$_2$CF$_2$—, $CF_3CF(CF_3)$—, $CF_3CF(CF_3)CF_2$—, $CF_3CF_2CF_2CF_2$—, $CF_3CF_2CF(CF_3)$—, $CF_3CF_2CF(CF_3)CF_2$—, and $CF_3CF(CF_3)CF_2CF_2$—. In some embodiments, $R_f^a$ is $CF_3CF_2CF_2$—. Representative $R_f^a$ groups include —$CF_2$—, —$CF(CF_3)$—, —$CF_2CF_2$—, —$CF(CF_3)CF_2$—, —$CF_2CF_2CF_2$—, —$CF(CF_3)CF_2CF_2$—, —$CF_2CF_2CF_2CF_2$—, and —$CF_2C(CF_3)_2$—. Representative $R_f^c$ groups include —$CF_2$—, —$CF(CF_3)$—, —$CF_2CF_2$—, —$CF_2CF_2CF_2$—, and —$CF(CF_3)CF_2$—. In some embodiments, $R_f^c$ is —$CF(CF_3)$—.

In some embodiments, $(R_f^b\text{—O—})_{z'}$ is represented by —$[CF_2O]_i[CF_2CF_2O]_j$—, —$[CF_2O]_i[CF(CF_3)CF_2O]_j$—, —$[CF_2O]_i[CF_2CF_2CF_2O]_j$—, —$[CF_2CF_2O]_i[CF_2O]_j$—, —$[CF_2CF_2O]_i[CF(CF_3)CF_2O]_j$—, —$[CF_2[CF_2CF_2O]_i[CF_2CF_2CF_2O]_j$—, —$[CF_2CF_2CF_2O]_i[CF_2CF(CF_3)O]_j$—, and $[CF_2CF_2CF_2O]_i[CF(CF_3)CF_2O]_j$—, wherein i+j is an integer of at least 3 (in some embodiments, at least 4, 5, or 6).

In some embodiments, Rf is selected from the group consisting of $C_3F_7O(CF(CF_3)CF_2O)_kCF(CF_3)$—, $C_3F_7O(CF_2CF_2CF_2O)_kCF_2CF_2$—, or $CF_3O(C_2F_4O)_gCF_2$—, wherein k has an average value in a range from 3 to 50 (in some embodiments, 3 to 25, 3 to 15, 3 to 10, 4 to 10, or 4 to 7), and wherein g has an average value in a range from 6 to 50 (in some embodiments, 6 to 25, 6 to 15, 6 to 10, 7 to 10, or 8 to 10). In some of these embodiments, Rf is $C_3F_7O(CF(CF_3)CF_2O)_kCF(CF_3)$—, wherein k has an average value in a range from 4 to 7. In some embodiments, Rf is selected from the group consisting of $CF_3O(CF_2O)_{x'}(C_2F_4O)_{y'}CF_2$— and $F(CF_2)_3$—O—$(C_4F_5O)_{z'}(CF_2)_3$—, wherein x', y', and z' each independently has an average value in a range from 3 to 50 (in some embodiments, 3 to 25, 3 to 15, 3 to 10, or even 4 to 10).

In some embodiments, Rf is a polyfluoropolyether group that has a weight average molecular weight of at least 750 (in some embodiments at least 850 or even 1000) grams per mole. In some embodiments, Rf has a weight average molecular weight of up to 6000 (in some embodiments, 5000 or even 4000) grams per mole. In some embodiments, Rf has a weight average molecular weight in a range from 750 grams per mole to 5000 grams per mole. Weight average molecular weights can be measured, for example, by gel permeation chromatography (i.e., size exclusion chromatography) using techniques known in the art.

Copolymers according to the present disclosure can be prepared, for example, by polymerizing a mixture of components typically in the presence of an initiator. By the term "polymerizing" it is meant forming a polymer or oligomer that includes at least one identifiable structural element due to each of the components. Typically, preparing the copolymer includes combining components comprising at least a first monomer having an ultraviolet absorbing group and at least a second monomer that is a fluorinated monomer.

Exemplary first monomers are those that include benzophenone, benzotriazole, triazine, cinnamate, cyanoacrylate, dicyano ethylene, salicylate, oxanilide, or para-aminobenzoate groups. Examples of suitable first monomers include 2-(cyano-β,β-biphenylacryloyloxy)ethyl-1-methacrylate, 2-(α-cyano-β,β-biphenylacryloyloxy)ethyl-2-methacrylamide, N-(4-methacryloylphenol)-N'-(2-ethylphenyl)oxamide, vinyl 4-ethyl-α-cyano-β-phenylcinnamate, 2-hydroxy-4-(2-hydroxy-3-methacryloyloxypropoxy)benzophenone, 2-hydroxy-4-methacryloyloxybenzophenone, 2-hydroxy-4-(2-acryloyloxyethoxy)benzophenone, 2-hydroxy-4-(4-acryloyloxybutoxy)benzophenone, 2,2'-dihydroxy-4-(2-acryloyloxyethoxy)benzophenone, 2-hydroxy-4-(2-acryloyloxyethoxy)-4'-(2-hydroxyethoxy)benzophenone, 4-(allyloxy)-2-hydroxybenzophenone, 2-(2'-hydroxy-3'-methacrylamidomethyl-5'-octylphenyl)benzotriazole, 2-(2-hydroxy-5-vinylphenyl)-2-benzotriazole, 2-(2H-benzotriazol-2-yl)-4-methyl-6-(2-propenyl)phenol, 2-(2'-hydroxy-5'-methacryloyloxyethylphenyl)-2H-benzotriazole, 2-(2'-hydroxy-5'-methacryloyloxyethylphenyl)-5-chloro-2H-benzotriazole, 2-(2'-hydroxy-5'-methacryloyloxypropylphenyl)-2H-benzotriazole, 2-(2'-hydroxy-5'-methacryloyloxypropylphenyl)-5-chloro-2H-benzotriazole, 2-(2'-hydroxy-3'-tert-butyl-5'-methacryloyloxyethylphenyl)-2H-benzotriazole, 2-(2'-hydroxy-3'-tertbutyl-5'-methacryloyloxyethylphenyl)-5-chloro-2H-benzotriazole, 2,4-diphenyl-6-[2-hydroxy-4-(2-acryloyloxyethoxy)]-1,3,5-triazine, 2,4-bis(2-methylphenyl)-6-[2-hydroxy-4-(2-acryloyloxyethoxy)]-1,3,5-triazine, 2,4-bis(2-methoxyphenyl)-6-[2-hydroxy-4-(2-acryloyloxyethoxy)]-1,3,5-triazine, 2,4-bis(2-ethylphenyl)-6-[2-hydroxy-4-(2-acryloyloxyethoxy)]-1,3,5-triazine, 2,4-bis(2-ethoxyphenyl)-6-[2-hydroxy-4-(2-acryloyloxyethoxy)]-1,3,5-triazine, 2,4-diphenyl-6-[2-hydroxy-4-(2-methacryloyloxyethoxy)]-1,3,5-triazine, 2,4-bis(2-methylphenyl)-6-[2-hydroxy-4-(2-methacryloyloxyethoxy)]-1,3,5-triazine, 2,4-bis(2-methoxyphenyl)-6-[2-hydroxy-4-(2-methacryloyloxyethoxy)]-1,3,5-triazine, 2,4-bis(2-ethylphenyl)-6-[2-hydroxy-4-(2-methacryloyloxyethoxy)]-1,3,5-triazine, 2,4-bis(2-ethoxyphenyl)-6-[2-hydroxy-4-(2-methacryloyloxyethoxy)]-1,3,5-triazine, 2,4-bis(2,4-dimethoxyphenyl)-6-[2-hydroxy-4-(2-acryloyloxyethoxy)]-1,3,5-triazine, 2,4-bis(2,4-dimethylphenyl)-6-[2-hydroxy-4-(2-acryloyloxyethoxy)]-1,3,5-triazine, 2,4-bis(2,4-diethoxyphenyl)-6-[2-hydroxy-4-(2-acryloyloxyethoxy)]-1,3,5-triazine, 2,4-bis (2,4-diethylphenyl)-6-[2-hydroxy-4-(2-acryloyloxyethoxy)]-1,3,5-triazine, methacrylates of the foregoing acrylates and acrylates of the foregoing methacrylates. Combinations of these first monomers may be used to prepare the copolymer. In some embodiments, the first monomer includes a triazine, a benzophenone, or a benzotriazole group. In these embodiments, the first monomer can be any of the monomers including a triazine, benzophenone, or benzotriazole group listed above. In some embodiments, the first monomer includes a triazine group. In these embodiments, the first monomer can be any of the monomers including a triazine group listed above.

Many of these first monomers can be obtained commercially from a variety of chemical suppliers. Others can be prepared by treating a UVA having an available hydroxyl group (e.g., other than a phenolic hydroxyl group ortho to a triazine, benzoyl, or benzotriazole group) with (meth)acrylic acid or an equivalent thereof using conventional esterification methods. The term (meth)acrylic refers to both acrylic and methacrylic. In the case of a UVA having an available phenol group (e.g., other than a phenolic hydroxyl group ortho to a triazine, benzoyl, or benzotriazole group), the phenol group may be treated with ethylene carbonate or ethylene oxide to form a hydroxyethyl group that can then be treated with (meth)acrylic acid or an equivalent thereof using conventional esterification methods.

The components that are useful for preparing the fluorinated polymers disclosed herein include a second monomer, typically a fluorinated free-radically polymerizable monomer independently represented by formula $Rf\text{-Q-}(C_mH_{2m})$—O—C(O)—C($R^1$)=$CH_2$, $Rf$—$SO_2$—N($R^3$)—$(C_mH_{2m'})$—O—C(O)—C($R^1$)=$CH_2$, or $Rf$—CO—N($R^4$)—$(C_mH_{2m'})$—O—C(O)—C($R^1$)=$CH_2$, wherein Rf, $R^3$, $R^4$, $R^1$, m, and m' are as defined above.

Some compounds of Formula Rf-Q-($C_mH_{2m}$)—O—C(O)—C($R^1$)=$CH_2$, are available, for example, from commercial sources (e.g., 3,3,4,4,5,5,6,6,6-nonafluorohexyl acrylate from Daikin Chemical Sales, Osaka, Japan; 3,3,4,4,5,5,6,6,6-nonafluorohexyl 2-methylacrylate from Indofine Chemical Co., Hillsborough, N.J.; 1H,1H,2H,2H-perfluorooctylacrylate from ABCR, Karlsruhe, Germany; and 2,2,3,3,4,4,5,5-octafluoropentyl acrylate and methacrylate and 3,3,4,4,5,6,6,6-octafluoro-5-(trifluoromethyl)hexyl methacrylate from Sigma-Aldrich, St. Louis, Mo.). Others can be made by known methods (see, e.g., EP 1311637 B1, published Apr. 5, 2006, for the preparation of 2,2,3,3,4,4,4-heptafluorobutyl 2-methylacrylate). Compounds wherein Q is —$SO_2N(R)$— can be made according to methods described in, e.g., U.S. Pat. No. 2,803,615 (Albrecht et al.) and U.S. Pat. No. 6,664,354 (Savu et al.), the disclosures of which, relating to free-radically polymerizable monomers and methods of their preparation, are incorporated herein by reference. A perfluoropolyether monomer of formula Rf—(CO)NH$CH_2CH_2$O(CO)C($R^1$)=$CH_2$ can be prepared by first reacting Rf—C(O)—$OCH_3$, for example, with ethanolamine to prepare alcohol-terminated Rf—(CO)NH$CH_2CH_2$OH, which can then be reacted with (meth)acrylic acid, (meth)acrylic anhydride, or (meth)acryloyl chloride to prepare the compound of Formula Rf—(CO)NH$CH_2CH_2$O(CO)C($R^1$)=$CH_2$, wherein $R^1$ is methyl or hydrogen, respectively. Other amino alcohols (e.g., amino alcohols of formula NRHXOH) can be used in this reaction sequence. In further examples, an ester of formula Rf—C(O)—$OCH_3$ or a carboxylic acid of formula Rf—C(O)—OH can be reduced using conventional methods (e.g., hydride, for example sodium borohydride, reduction) to an alcohol of formula Rf—$CH_2$OH. The alcohol of formula Rf—$CH_2$OH can then be reacted with methacryloyl chloride, for example, to provide a perfluoropolyether monomer of formula Rf—$CH_2$O(CO)C($R^1$)=$CH_2$. Examples of suitable reactions and reagents are further disclosed, for example, in the European Pat. Doc EP 870 778 A1, published Oct. 14, 1998, and U.S. Pat. No. 3,553,179 (Bartlett et al.).

In some embodiments, copolymers according to the present disclosure further comprise at least one (e.g., at least 2, 3, 4, 5, 6, 7, 8, 9, 10, 15, or at least 20, 30, 35, 40, 45, 50, 100, or up to 200) third divalent unit independently represented by formula:

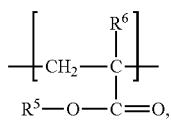

wherein each $R^6$ is independently hydrogen or methyl (in some embodiments, hydrogen, in some embodiments, methyl), and wherein each $R^5$ is independently alkyl having from 1 to 4 carbon atoms (in some embodiments, methyl, ethyl, n-propyl, isopropyl, n-butyl, iso-butyl, or tert-butyl). In some embodiments, each $R^5$ is independently methyl or ethyl. In some embodiments, each $R^5$ is methyl. In some of these embodiments, the copolymer is prepared by including at least one compound represented by formula $R^5$—O—C(O)—C($R^6$)=$CH_2$ (e.g., methyl methacrylate, ethyl acrylate, propyl acrylate, butyl acrylate) in the components to be polymerized.

In some embodiments, the copolymer according to present disclosure is represented by formula:

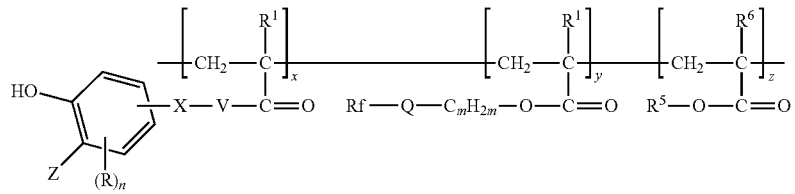

wherein Z, R, n, X, V, $R^1$, Rf, Q, m, $R^5$, and $R^6$ are as defined above in any of their embodiments, x and y are in a range from 1 to 200, and z is in a range from 0 to 200. However, it should be understood that the representation of the order of the divalent units is for convenience only and not meant to specify that the copolymer is a block copolymer. Random copolymers having first, second, and optionally third divalent units are also included in the representation.

The polymerization reaction for making the copolymers according to the present disclosure can be carried out in the presence of an added free-radical initiator. Free radical initiators such as those widely known and used in the art may be used to initiate polymerization of the components. Examples of suitable free-radical initiators include azo compounds (e.g., 2,2'-azobisisobutyronitrile (AIBN), 2,2'-azobis (2-methylbutyronitrile), or azo-2-cyanovaleric acid), hydroperoxides (e.g., cumene, tert-butyl or tert-amyl hydroperoxide), dialkyl peroxides (e.g., di-tert-butyl or dicumylperoxide), peroxyesters (e.g., tert-butyl perbenzoate or di-tert-butyl peroxyphthalate), and diacylperoxides (e.g., benzoyl peroxide or lauryl peroxide).

The free-radical initiator may also be a photoinitiator. Examples of useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); 1-hydroxycyclohexyl phenyl ketone; and acylphosphine oxide derivatives and acylphosphonate derivatives (e.g., bis(2,4,6-trimethylbenzoyl)phenylphosphine oxide, diphenyl-2,4,6-trimethylbenzoylphosphine oxide, isopropoxyphenyl-2,4,6-trimethylbenzoylphosphine oxide, or dimethyl pivaloylphosphonate). Many photoinitiators are available, for examples, from BASF Corporation under the trade designation "IRGACURE". The photoinitiator may be selected so that the wavelength of light required to initiate polymerization is not absorbed by the ultraviolet absorbing group.

In some embodiments, the polymerization reaction is carried out in solvent. The components may be present in the reaction medium at any suitable concentration, (e.g., from about 5 percent to about 80 percent by weight based on the total weight of the reaction mixture). Illustrative examples of suitable solvents include aliphatic and alicyclic hydrocarbons (e.g., hexane, heptane, and cyclohexane), aromatic solvents (e.g., benzene, toluene, and xylene), ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone, and methyl isobutyl ketone), halogenated solvents (e.g., methylchloroform, 1,1,2-trichloro-1,2,2-trifluoroethane, trichloroethylene, trifluorotoluene, and hydrofluoroethers available, for example, from 3M Company, St. Paul, Minn., under the trade designations "HFE-7100" and "HFE-7200"), and mixtures thereof.

Polymerization can be carried out at any temperature suitable for conducting an organic free-radical reaction. Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or from about 50° C. to about 80°c).

Free-radical polymerizations may be carried out in the presence of chain transfer agents. Typical chain transfer agents that may be used in the preparation compositions according to the present invention include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); poly(ethylene glycol)-substituted mercaptans; carboxy-substituted mercaptans (e.g., mercaptopropionic acid or mercaptoacetic acid): amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan).

Adjusting, for example, the concentration and activity of the initiator, the concentration of each of the reactive monomers, the temperature, the concentration of the chain transfer agent, and the solvent using techniques known in the art can control the molecular weight of the copolymer.

The weight ratio of the first divalent units, second divalent units, and third divalent units, if present, in the copolymer disclosed herein may vary. For example, the first divalent units may be present in the copolymer in a range from 5 to 50 (in some embodiments, 10 to 40 or 10 to 30) percent, based on the total weight of the copolymer. The second divalent units may be present in a range from 5 to 95 percent, based on the total weight of the copolymer. In some embodiments, the second divalent unit is present in the copolymer in an amount of up to 50, 40, 30, 25, 20, or 10 percent by weight, based on the total weight of the copolymer. When the second divalent unit is present in an amount of at least 50, 60, 75, or 80 percent, it may be useful to use the copolymer in combination with a second copolymer having a lower weight percentage of second divalent units when making a composition according to the present disclosure as described below. When present, third divalent units may be present in a range from 5 to 90, 20 to 90, 50 to 90, or 50 to 80 percent by weight, based on the total weight of the copolymer.

The fluoropolymer is typically a fluorinated thermoplastic obtained by polymerizing one or more types of fully fluorinated or partially fluorinated monomers (e.g., tetrafluoroethylene, vinyl fluoride, vinylidiene fluoride, hexafluoropropylene, pentafluoropropylene, trifluoroethylene, trifluorochloroethylene, and combinations of these in any useful ratio.) Fluoropolymers useful for practicing the present disclosure typically have at least some degree of crystallinity. In some embodiments, fluoropolymers useful for practicing the present disclosure have weight average molecular weights in a range from 30,000 grams per mole to 200,000 grams per mole. In some embodiments, the weight average molecular weight is at least 40,000 or 50,000 grams per mole up to 100,000, 150,000, 160,000, 170,000, 180,000, or up to 190,000 grams per mole. Useful fluoropolymers include ethylene-tetrafluoroethylene copolymers (ETFE), tetrafluoroethylene-hexafluoropropylene copolymers (FEP), tetrafluoroethylene-hexafluoropropylene-vinylidene fluoride copolymers (THV), polyvinylidene fluoride (PVDF), blends thereof, and blends of these and other fluoropolymers. Another useful fluoropolymer is a PDVF and hexafluoropropylene (HFP) blend in a variety of useful rations (e.g., in a range from 50:50 to 95:5 PVDF:HFP, such as 90:10). In some embodiments, the compositions according to the present disclosure include the fluoropolymer in an amount of at least 50, 60, 70, 80, 85, 90, 95, or 96 percent by weight based on the total weight of the composition. In some embodiments, the compositions according to the present disclosure include the fluoropolymer in an amount greater than 95 percent by weight, based on the total weight of the composition. In some embodiments, the compositions according to the present disclosure include the fluoropolymer in an amount of up to 99.5, 99, or 98 percent by weight based on the total weight of the composition.

The composition comprising the fluoropolymer and the copolymer described above can also include non-fluorinated materials. For example, the composition can include poly(methyl methacrylate) (PMMA) polymer or a copolymer of methyl methacrylate and a $C_2$-$C_5$ alkyl acrylate or methacrylate. The PMMA polymer or copolymer can have a weight average molecular weight of at least 50,000 grams per mole, 75,000 grams per mole, 100,000 grams per mole, 120,000 grams per mole, 125,000 grams per mole, 150,000 grams per mole, 165,000 grams per mole, or 180,000 grams per mole. The PMMA polymer or copolymer may have a weight average molecular weight of up to 500,000 grams per mole, in some embodiments, up to 400,000 grams per mole, and in some embodiments, up to 250,000 grams per mole. In some embodiments, a blend of polyvinylidene fluoride and poly(methyl methacrylate) can be useful.

In some embodiments, the composition according to the present disclosure includes a second copolymer comprising at least one (e.g., at least 2, 3, 4, 5, 6, 7, 8, 9, 10, 15, or at least 20 up to 30, 35, 40, 45, 50, 100, or up to 200) third divalent units and at least one (e.g., at least 2, 3, 4, 5, 6, 7, 8, 9, 10, 15, or at least 20 up to 30, 35, 40, 45, 50, 100, or up to 200) first divalent units. The first and third divalent units may be as described in any of the embodiments described above for the first and third divalent units in connection with the copolymer according to the present disclosure. The second copolymer may be, for example, a copolymer of an acrylate- or methacrylate-functional ultraviolet absorbing group and methyl methyacrylate. As described in the Examples, below, if a copolymer including a high weight percentage of the second divalent units results in some non-uniformity in color, haze, or continuity in a film made from the composition, including the second copolymer in the composition can unexpectedly provide a film having uniform color, haze, and caliper.

The composition according to the present disclosure typically includes a blend of the fluoropolymer, the copolymer, and any non-fluorinated polymers or second copolymers including the first divalent units. By "blend" it is meant that the fluoropolymer and the copolymer according to the present disclosure are not located in separate, distinguishable domains. In other words, the copolymer is typically dispersed throughout the composition; it is not isolated as if in a core-shell polymer particle. In many embodiments, the components of the composition are surprisingly compatible, and the composition appears homogeneous when the components are blended together.

The advantageous compatibility of the copolymer according to the present disclosure and the fluoropolymer in the compositions disclosed herein allows the compositions to be compounded without organic solvent. For example, the copolymer and the fluoropolymer can be melt-processed, compounded, mixed, or milled on conventional equipment. Conveniently, uniform masterbatch compositions can be made that include the copolymer according to the present disclosure at relatively high concentrations in the fluoropolymer. The masterbatch compositions can be extruded (e.g., in a single- or twin-screw extruder) and formed into films. After extrusion, the compositions can also be pelletized or granulated. The masterbatch compositions can then be extrusion compounded with additional fluoropolymer or non-fluorinated polymer (e.g., PMMA) and formed into films.

Other stabilizers may be added to the compositions according to the present disclosure to improve resistance to UV light. Examples of these include hindered amine light stabilizers (HALS) and anti-oxidants. HALS are typically compounds that can scavenge free-radicals, which can result from photodegradation. Some suitable HALS include a tetramethylpiperidine group, in which the nitrogen atoms on the piperidine may be unsubstituted or substituted by alkyl or acyl. Suitable HALS include decanedioic acid, bis (2,2,6,6-tetramethyl-1-(octyloxy)-4-piperidinyl)ester, bis(2,2,6,6-tetramethyl-4-piperidyl)sebacate, 8-acetyl-3-dodecyl-7,7,9,9-tetramethyl-1,3,8-triazaspiro(4,5)-decane-2,5-dione, bis (2,2,6,6-tetramethyl-4-hydroxypiperidine succinate), and bis(N-methyl-2,2,6,6-tetramethyl-4-piperidyl)secacate. Suitable HALS include those available, for example, from BASF under the trade designations "CHIMASSORB". Exemplary anti-oxidants include those obtained under the trade designations "IRGAFOS 126", "IRGANOX 1010" and "ULTRANOX 626", also available from BASF Corporation. These stabilizers, if present, can be included in the compositions according to the present disclosure in any effective amount, typically up to 0.1, 0.2, 0.3, 0.4, or even up to 0.5 percent by weight based on the total weight of the composition and typically at least 0.1, 0.2, or even at least 0.3 percent by weight.

Typically the UVA oligomer is compatible with the fluoropolymer. Ultraviolet light-absorbing oligomers useful in the compositions according to the present disclosure are linear or branched. Typically, they are linear oligomers. They may be random copolymers or block copolymers. They are not covalently crosslinked, and therefore may be considered thermoplastic. Accordingly, they may be dissolved in solvents and have measurable molecular weights as opposed to covalently crosslinked polymers, which cannot be dissolved in solvents and molecular weights approaching infinity. Thermoplastics are also typically melt-processable such as by an extrusion process. Oligomers useful in the compositions according to the present disclosure have a number average molecular weight of up to 50,000 grams per mole. In some of these embodiments, the oligomer has a number average molecular weight of up to 40,000, 30,000, 20,000, or less than 20,000 grams per mole (e.g., up to 19,500, 19,000, or 18,500 grams per mole). In some embodiments, the number average molecular weight of the oligomer may be at least 1000 grams per mole, greater than 5,000 grams per mole, or greater than 7,500 grams per mole. Useful ultraviolet light-absorbing oligomers typically have a distribution of molecular weights and compositions. Weight and number average molecular weights can be measured, for example, by gel permeation chromatography (i.e., size exclusion chromatography) using techniques known to one of skill in the art.

Ultraviolet light-absorbing oligomers useful in the compositions according to the present disclosure in any of their embodiments include a first divalent unit comprising a pendent ultraviolet absorbing (UVA) group. In some embodiments in which the composition is an extruded film or in the method of making this composition, any class of UVA may be useful for providing the UVA group. Examples of useful classes include benzophenones, benzotriazoles, triazines, cinnamates, cyanoacrylates, dicyano ethylenes, salicylates, oxanilides, and para-aminobenzoates. In some of these embodiments, the pendent ultraviolet absorbing group comprises a triazine, a benzophenone, or a benzotriazole. In some embodiments of the compositions according to the present disclosure, the pendent ultraviolet absorbing group is a triazine. In some embodiments, the pendent ultraviolet absorbing group has enhanced spectral coverage in the long-wave UV region (e.g., 315 nm to 400 nm), enabling it to block the high wavelength UV light that can cause yellowing in polymers. The first divalent unit can be considered to be a repeating unit in the ultraviolet absorbing oligomer.

In some of embodiments of the extruded film or method of making the film, the first divalent unit may be represented by formula —[—CH$_2$—C(H)UVA-]—, —[—CH$_2$—C(H)C(O)—O—X-UVA-]—, —[—CH$_2$—C(H)C(O)—NH—X-UVA-]—, —[—CH$_2$—C(CH$_3$)C(O)—O—X-UVA-]—, or —[—CH$_2$—C(CH$_3$)C(O)—NH—X-UVA-]—, wherein X is an alkylene or alkyleneoxy group having from 1 to 10 (in some embodiments, 2 to 6 or 2 to 4) carbon atoms and optionally interrupted by one or more —O— groups and optionally substituted by a hydroxyl group, and wherein UVA includes any of the above embodiments of UVA groups. In the alkyleneoxy group, the oxygen is attached to the UVA group. The oligomer may include (e.g., at least 2, 3, 4, 5, 6, 7, 8, 9, 10, 15, or at least 20 up to 30, 35, 40, 45, 50, 100, or up to 200) of these repeating units. The repeating unit can be derived from a substituted vinyl, substituted acrylate, or substituted methacrylate group. In some of these embodiments, the first divalent unit is represented by formula:

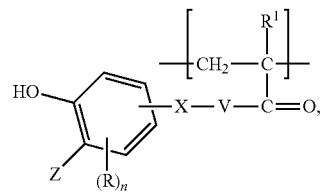

wherein R$^1$ is hydrogen or methyl, V is O or NH, X is alkylene or alkyleneoxy group having from 1 to 10 (in some embodiments, 2 to 6 or 2 to 4) carbon atoms and optionally interrupted by one or more —O— groups and optionally substituted by a hydroxyl group, R is alkyl (e.g., having from one to four carbon atoms), n is 0 or 1, and Z is a benzoyl group, a 4,6-bisphenyl[1,3,5]triazin-2-yl group, or a 2H-benzotriazol-2-yl group, wherein the benzoyl group, 4,6-bisphenyl[1,3,5]triazin-2yl group, and 2H-benzotriazol2-yl group is optionally substituted by one or more alkyl, aryl, alkoxy, hydroxyl, or halogen substituents, or a combination of these substituents. In some embodiments, the alkyl and/or alkoxy substituent independently has 1 to 4 or 1 to 2 carbon atoms. In some embodiments, each halogen substituent is independently a chloro, bromo, or iodo group. In some embodiments, each halogen substituent is a chloro group. The term "aryl" as used herein includes carbocyclic aromatic rings or ring systems, for example, having 1, 2, or 3 rings and optionally containing at least one heteroatom (e.g., O, S, or N) in the ring. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl. In the alkyleneoxy group, the oxygen is attached to the substituted benzene ring. In some embodiments, each V is O and X is ethylene, propylene, butylene, ethyleneoxy, propyleneoxy, or butyleneoxy, with the oxygen attached to the substituted benzene ring. In some embodiments, n is 0. In some embodiments, R is methyl, ethyl, n-propyl, isopropyl, n-butyl, isobutyl, s-butyl, or t-butyl, and n is 1. In some embodiments, Z is an unsubstituted benzoyl group. In some embodiments, Z is 4,6-bis(2, 4-dimethylphenyl)[1,3,5]triazin-2-yl; 4,6-bis(2,4-diethylphenyl)[1,3,5]triazin-2-yl; 4,6-bis(2, 4-dimethoxyphenyl)[1, 3,5]triazin-2-yl; or 4,6-bis(2,4-diethoxyphenyl)[1,3,5] triazin-2-yl. In some embodiments, Z is 2H-benzotriazol-2-yl or 5-chloro-2H-benzotriazol-2-yl.

In embodiments of the compositions and method disclosed herein in which the ultraviolet light-absorbing group is a triazine, the first divalent unit may be represented by formula:

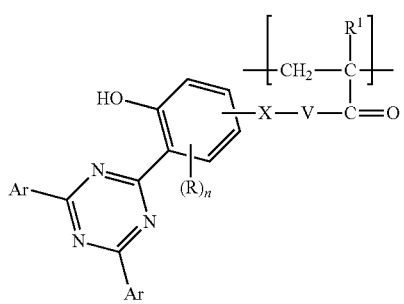

wherein R, $R^1$, X, and V are as described above in any of their embodiments, and wherein each Ar is a phenyl group substituted by one or more alkyl, aryl, alkoxy, hydroxyl, or halogen substituents, or a combination of these substituents. In some embodiments, the alkyl and/or alkoxy substituent independently has 1 to 4 or 1 to 2 carbon atoms. In some embodiments, each halogen substituent is independently a chloro, bromo, or iodo group. In some embodiments, each halogen substituent is a chloro group. The aryl substituent is as defined above. In some embodiments, Ar is 2,4-dimethylphenyl; 2,4-diethylphenyl; 2,4-dimethoxyphenyl; or 2,4-diethoxyphenyl.

In some embodiments, ultraviolet light-absorbing oligomers useful in the compositions according to the present disclosure and/or prepared according to the method of the present disclosure comprise at least one (e.g., at least 2, 3, 4, 5, 6, 7, 8, 9, 10, 15, or at least 20 up 30, 35, 40, 45, 50, 100, or up to 200) second divalent unit independently represented by formula:

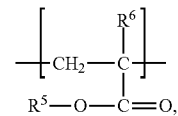

wherein each $R^6$ is independently hydrogen or methyl (in some embodiments, hydrogen, in some embodiments, methyl), and wherein each $R^5$ is independently alkyl having from 1 to 4 carbon atoms (in some embodiments, methyl, ethyl, n-propyl, isopropyl, n-butyl, iso-butyl, or tert-butyl). In some embodiments, each $R^5$ is independently methyl or ethyl. In some embodiments, each $R^5$ is methyl. In some embodiments, both $R^5$ and $R^6$ are methyl.

In some embodiments, ultraviolet light-absorbing oligomers useful in the compositions according to the present disclosure and/or made according to the method of the present disclosure in any of the embodiments described above include (e.g., at least 1, 2, 3, 4, 5, 6, 7, 8, 9, 10, 15, or at least 20 up to 30, 35, 40, 45, 50, 100, or up to 200) third divalent units independently represented by formula:

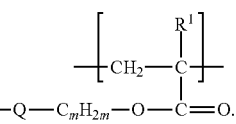

For divalent units having this formula, each $R^1$ is independently hydrogen or methyl (in some embodiments, hydrogen, in some embodiments, methyl). Q is a bond, —SO$_2$N(R)—, or —C(O)—N(R)— wherein R is alkyl having 1 to 4 carbon atoms (e.g., methyl, ethyl, n-propyl, isopropyl, n-butyl, or isobutyl) or hydrogen. In some embodiments, Q is a bond. In some embodiments, Q is —SO$_2$N(R)—. In some of these embodiments, R is methyl or ethyl. m is an integer from 1 to 11 (i.e., 1, 2, 3, 4, 5, 6, 7, 8, 9, 10, or 11). In some of these embodiments, m is 1; in other of these embodiments, m is 2. In some embodiments wherein Q is —SO$_2$N(R)—, m is an integer from 2 to 11, 2 to 6, or 2 to 4. In some embodiments wherein Q is a bond, m is an integer from 1 to 6, 1 to 4, or 1 to 2. In embodiments wherein Q is a bond, it should be understood that the third divalent units may also be represented by formula:

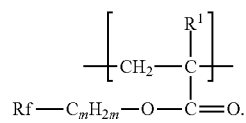

In some embodiments, oligomers disclosed herein, including any of the embodiments described above in connection to the first divalent units, comprise (e.g., at least 2, 3, 4, 5, 6, 7, 8, 9, 10, 15, or at least 20 up 30, 35, 40, 45, 50, 100, or up to 200) third divalent units independently represented by formula:

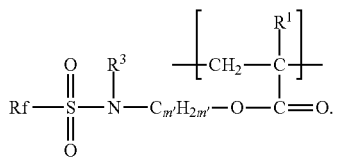

For divalent units of this formula, m' is an integer from 2 to 11 (i.e., 2, 3, 4, 5, 6, 7, 8, 9, 10, or 11). In some embodiments, m' is an integer from 2 to 6 or 2 to 4. $R^3$ is alkyl having 1 to 4 carbon atoms (e.g., methyl, ethyl, n-propyl, isopropyl, n-butyl, or isobutyl) or hydrogen. In some embodiments, $R^3$ is methyl or ethyl. $R^1$ is independently hydrogen or methyl (in some embodiments, hydrogen, in some embodiments, methyl).

For any of the embodiments of the third divalent units, each Rf independently represents a fluorinated alkyl group having from 1 to 6 (in some embodiments, 2 to 6 or 2 to 4) carbon atoms (e.g., trifluoromethyl, perfluoroethyl, 1,1,2,2-tetrafluoroethyl, 2-chlorotetrafluoroethyl, perfluoro-n-propyl, perfluoroisopropyl, perfluoro-n-butyl, 1,1,2,3,3,3-hexafluoropropyl, perfluoroisobutyl, perfluoro-sec-butyl, or perfluoro-tert-butyl, perfluoro-n-pentyl, pefluoroisopentyl, or perfluorohexyl). In some embodiments, Rf is perfluorobutyl (e.g., perfluoro-n-butyl, perfluoroisobutyl, or perfluoro-sec-butyl). In some embodiments, Rf is perfluoropropyl (e.g., perfluoro-n-propyl or perfluoroisopropyl). The oligomer may include a mixture of fluorinated monomers having different Rf fluoroalkyl groups (e.g., with an average of up to 6 or 4 carbon atoms).

In some embodiments, in oligomers disclosed herein, including any of the embodiments described above in connection to the first divalent units, Rf is a polyfluoroether group. The term "polyfluoroether" refers to a compound or group having at least 3 (in some embodiments, at least 4, 5, 6, 7, 8, 9, 10, 11, 12, 13, 14, 15, 16, 17, 18, 19, or even 20) carbon atoms and at least 1 (in some embodiments, at least 2, 3, 4, 5, 6, 7, or even 8) ether linkages, wherein hydrogen atoms on the carbon atoms are replaced with fluorine atoms. In some embodiments, Rf has up to 100, 110, 120, 130, 140, 150, or even 160 carbon atoms and up to 25, 30, 35, 40, 45, 50, 55, or even 60 ether linkages.

In some embodiments, including embodiments wherein Rf is a polyfluoroether group, oligomers disclosed herein comprise (e.g., at least 2, 3, 4, 5, 6, 7, 8, 9, 10, 15, or at least 20, 30, 35, 40, 45, 50, 100, or up to 200) third divalent units independently represented by formula:

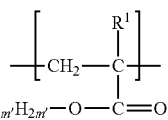

For divalent units of this formula, m' is an integer from 2 to 11 (i.e., 2, 3, 4, 5, 6, 7, 8, 9, 10, or 11). In some embodiments, m' is an integer from 2 to 6 or 2 to 4. $R^4$ is alkyl having 1 to 4 carbon atoms (e.g., methyl, ethyl, n-propyl, isopropyl, n-butyl, or isobutyl) or hydrogen. In some embodiments, $R^4$ is methyl or ethyl. In some embodiments, $R^4$ is hydrogen. $R^1$ is independently hydrogen or methyl (in some embodiments, hydrogen, in some embodiments, methyl).

The polyfluoroether group Rf can be linear, branched, cyclic, or combinations thereof and can be saturated or unsaturated. Polyfluoroether groups include those in which hydrogen or chlorine atoms are present instead of fluorine atoms with typically up to one atom of either hydrogen or chlorine is present for every two carbon atoms. The oligomer may include a mixture of fluorinated monomers having different Rf polyfluoroether groups. In some embodiments, the polyfluoroether group is a perfluoropolyether group (i.e., all of the hydrogen atoms on the carbon atoms are replaced with fluorine atoms). Exemplary perfluoropolyethers include perfluorinated repeating units represented by at least one of $-(C_dF_{2d})-$, $-(C_dF_{2d}O)-$, $-(CF(L'))-$, $-(CF(L')O)-$, $-(CF(L')C_dF_{2d}O)-$, $-(C_dF_{2d}CF(L')O)-$, or $-(CF_2CF(L')O)-$. In these repeating units, d is typically an integer from 1 to 10. In some embodiments, d is an integer from 1 to 8, 1 to 6, 1 to 4, or 1 to 3. The L' group can be a perfluoroalkyl group optionally interrupted by at least one ether linkage or a perfluoroalkoxy group, each of which may be linear, branched, cyclic, or a combination thereof. The L' group typically has up to 12 (in some embodiments, up to 10, 8, 6, 4, 3, 2, or 1) carbon atoms. In some embodiments, the L' group can have up to 4 (in some embodiments, up to 3, 2, or 1) oxygen atoms; in some embodiments L' has no oxygen atoms. In these perfluoropolyether structures, different repeating units can be combined in a block or random arrangement to form the Rf group.

In some embodiments, Rf is represented by formula $R_f^a-O-(R_f^b-O-)_z(R_f^c)-$, wherein $R_f^a$ is a perfluoroalkyl having 1 to 10 (in some embodiments, 1 to 6, 1 to 4, 2 to 4, or 3) carbon atoms; each $R_f^b$ is independently a perfluoroalkylene having 1 to 4 (i.e., 1, 2, 3, or 4) carbon atoms; $R_f^c$ is a perfluoroalkylene having 1 to 6 (in some embodiments, 1 to 4 or 2 to 4) carbon atoms; and z' is in a range from 2 to 50 (in some embodiments, 2 to 25, 2 to 20, 3 to 20, 3 to 15, 5 to 15, 6 to 10, or 6 to 8). Representative $R_f^a$ groups include $CF_3-$, $CF_3CF_2-$, $CF_3CF_2CF_2-$, $CF_3CF(CF_3)-$, $CF_3CF(CF_3)CF_2-$, $CF_3CF_2CF_2CF_2-$, $CF_3CF_2CF(CF_3)-$, $CF_3CF_2CF(CF_3)CF_2-$, and $CF_3CF(CF_3)CF_2CF_2-$. In some embodiments, Rf is $CF_3CF_2CF_2-$. Representative $R_f^b$ groups include $-CF_2-$, $-CF(CF_3)-$, $-CF_2CF_2-$, $-CF(CF_3)CF_2-$, $-CF_2CF_2CF_2-$, $-CF(CF_3)CF_2CF_2-$, $-CF_2CF_2CF_2CF_2-$, and $-CF_2C(CF_3)_2-$. Representative $R_f^c$ groups include $-CF_2-$, $-CF(CF_3)-$, $-CF_2CF_2-$, $-CF_2CF_2CF_2-$, and $-CF(CF_3)CF_2-$. In some embodiments, $R_f^c$ is $-CF(CF_3)-$.

In some embodiments, $(R\pm^b-O-)_z$ is represented by $-[CF_2O]_i[CF_2CF_2O]_j-$, $-[CF_2O]_i[CF(CF_3)CF_2O]_j-$, $-[CF_2O]_i[CF_2CF_2CF_2O]_j-$, $-[CF_2CF_2O]_i[CF_2O]_j-$, $-[CF_2CF_2O]_i[CF(CF_3)CF_2O]_j-$, $-[C_3F[CF_2CF_2O]_j[CF_2CF_2O]_j-$, $-[CF_2CF_2CF_2O]_i[CF_2CF(CF_3)O]_j-$, and $[CF_2CF_2CF_2O]_i[CF(CF_3)CF_2O]_j-$, wherein i+j is an integer of at least 3 (in some embodiments, at least 4, 5, or 6).

In some embodiments, Rf is selected from the group consisting of $C_3F_7O(CF(CF_3)CF_2O)_kCF(CF_3)-$, $C_3F_7O(CF_2CF_2CF_2O)_kCF_2CF_2-$, or $CF_3O(C_2F_4O)_gCF_2-$, wherein k has an average value in a range from 3 to 50 (in some embodiments, 3 to 25, 3 to 15, 3 to 10, 4 to 10, or 4 to 7), and wherein g has an average value in a range from 6 to 50 (in some embodiments, 6 to 25, 6 to 15, 6 to 10, 7 to 10, or 8 to 10). In some of these embodiments, Rf is $C_3F_7O(CF(CF_3)CF_2O)_kCF(CF_3)-$, wherein k has an average value in a range from 4 to 7. In some embodiments, Rf is selected from the group consisting of $CF_3O(CF_2O)_{x'}(C_2F_4O)_{y'}CF_2-$ and $F(CF_2)_3-O-(C_4F_5O)_z(CF_2)_3-$, wherein x', y', and z' each independently has an average value in a range from 3 to 50 (in some embodiments, 3 to 25, 3 to 15, 3 to 10, or even 4 to 10).

In some embodiments, Rf is a polyfluoropolyether group that has a weight average molecular weight of at least 750 (in some embodiments at least 850 or even 1000) grams per mole. In some embodiments, Rf has a weight average molecular weight of up to 6000 (in some embodiments, 5000 or even 4000) grams per mole. In some embodiments, Rf has a weight average molecular weight in a range from 750 grams per mole to 5000 grams per mole. Weight average molecular weights can be measured, for example, by gel permeation chromatography (i.e., size exclusion chromatography) using techniques known in the art.

Oligomers according to the present disclosure can be prepared, for example, by polymerizing a mixture of components typically in the presence of an initiator. By the term "polymerizing" it is meant forming a polymer or oligomer that includes at least one identifiable structural element due to each of the components. Typically, preparing the oligomer includes combining components comprising at least a first monomer having an ultraviolet light-absorbing group and at least one of a second or a third monomer, described below.

Suitable first monomers for some embodiments of the compositions and methods disclosed herein are those that include benzophenone, benzotriazole, triazine, cinnamate, cyanoacrylate, dicyano ethylene, salicylate, oxanilide, or para-aminobenzoate groups. Examples of suitable first monomers include 2-(cyano-β,β-biphenylacryloyloxy) ethyl-1-methacrylate, 2-(α-cyano-β,β-biphenylacryloyloxy) ethyl-2-methacrylamide, N-(4-methacryloylphenol)-N'-(2-ethylphenyl)oxamide, vinyl 4-ethyl-α-cyano-β-phenylcinnamate, 2-hydroxy-4-(2-hydroxy-3-methacryloyloxypropoxy)benzophenone, 2-hydroxy-4-methacryloyloxybenzophenone, 2-hydroxy-4-(2-acryloyloxyethoxy)benzophenone, 2-hydroxy-4-(4-acryloyloxybutoxy)benzophenone, 2,2'-dihydroxy-4-(2-acryloyloxyethoxy)benzophenone, 2-hydroxy-4-(2-acryloyloxyethoxy)-4'-(2-hydroxyethoxy)benzophenone, 4-(allyloxy)-2-hydroxybenzophenone, 2-(2'-hydroxy-3'-methacrylamidomethyl-5'-octylphenyl)benzotriazole, 2-(2-hydroxy-5-vinylphenyl)-2-benzotriazole, 2-(2H-benzotriazol-2-yl)-4-methyl-6-(2-propenyl)phenol, 2-(2'-hydroxy-5'-methacryloyloxyethylphenyl)-2H-benzotriazole, 2-(2'-hydroxy-5'-methacryloyloxyethylphenyl)-5-chloro-2H-benzotriazole, 2-(2'-hydroxy-5'-methacryloyloxypropylphenyl)-2H-benzotriazole, 2-(2'-hydroxy-5'-methacryloyloxypropylphenyl)-5-chloro-2H-benzotriazole, 2-(2'-hydroxy-3'-tert-butyl-5'-methacryloyloxyethylphenyl)-2H-benzotriazole, 2-(2'-hydroxy-3'-tertbutyl-5'-methacryloyloxyethylphenyl)-5-chloro-2H-benzotriazole, 2,4-diphenyl-6-[2-hydroxy-4-(2-acryloyloxyethoxy)]-1,3,5-triazine, 2,4-bis(2-methylphenyl)-6-[2-hydroxy-4-(2-acryloyloxyethoxy)]-1,3,5-triazine, 2,4-bis(2-methoxyphenyl)-6-[2-hydroxy-4-(2-acryloyloxyethoxy)]-1,3,5-triazine, 2,4-bis(2-ethylphenyl)-6-[2-hydroxy-4-(2-acryloyloxyethoxy)]-1,3,5-triazine, 2,4-bis(2-ethoxyphenyl)-6-[2-hydroxy-4-(2-acryloyloxyethoxy)]-1,3,5-triazine, 2,4-diphenyl-6-[2-hydroxy-4-(2-methacryloyloxyethoxy)]-1,3,5-triazine, 2,4-bis(2-methylphenyl)-6-[2-hydroxy-4-(2-methacryloyloxyethoxy)]-1,3,5-triazine, 2,4-bis(2-methoxyphenyl)-6-[2-hydroxy-4-(2-methacryloyloxyethoxy)]-1,3,5-triazine, 2,4-bis(2-ethylphenyl)-6-[2-hydroxy-4-(2-methacryloyloxyethoxy)]-1,3,5-triazine, 2,4-bis(2-ethoxyphenyl)-6-[2-hydroxy-4-(2-methacryloyloxyethoxy)]-1,3,5-triazine, 2,4-bis(2,4-dimethoxyphenyl)-6-[2-hydroxy-4-(2-acryloyloxyethoxy)]-1,3,5-triazine, 2,4-bis(2,4-dimethylphenyl)-6-[2-hydroxy-4-(2-acryloyloxyethoxy)]-1,3,5-triazine, 2,4-bis(2,4-diethoxyphenyl)-6-[2-hydroxy-4-(2-acryloyloxyethoxy)]-1,3,5-triazine, 2,4-bis (2,4-diethylphenyl)-6-[2-hydroxy-4-(2-acryloyloxyethoxy)]-1,3,5-triazine, methacrylates of the foregoing acrylates and acrylates of the foregoing methacrylates. Combinations of these first monomers may be used to prepare the oligomer. In some embodiments, the first monomer includes a triazine, a benzophenone, or a benzotriazole group. In these embodiments, the first monomer can be any of the monomers including a triazine, benzophenone, or benzotriazole group listed above. In some embodiments of the composition according to the present disclosure, the first monomer includes a triazine group. In these embodiments, the first monomer can be any of the monomers including a triazine group listed above.

Many of these first monomers can be obtained commercially from a variety of chemical suppliers. Others can be prepared by treating a UVA having an available hydroxyl group (e.g., other than a phenolic hydroxyl group ortho to a triazine, benzoyl, or benzotriazole group) with (meth)acrylic acid or an equivalent thereof using conventional esterification methods. The term (meth)acrylic refers to both acrylic and methacrylic. In the case of a UVA having an available phenol group (e.g., other than a phenolic hydroxyl group ortho to a triazine, benzoyl, or benzotriazole group), the phenol group may be treated with ethylene carbonate or ethylene oxide to form a hydroxyethyl group that can then be treated with (meth)acrylic acid or an equivalent thereof using conventional esterification methods.

The components that are useful for preparing the oligomers disclosed herein can include a second monomer. In some of these embodiments, the oligomer is prepared by including at least one compound represented by formula $R^5$—O—C(O)—C($R^6$)=$CH_2$ (e.g., methyl methacrylate, ethyl acrylate, propyl acrylate, butyl acrylate) as the second monomer in the components to be polymerized. $R^5$ and $R^6$ are as defined above in any of their embodiments.

The components that are useful for preparing the oligomers disclosed herein can include a third monomer, typically a fluorinated free-radically polymerizable monomer independently represented by formula Rf-Q-($C_mH_{2m}$)—O—C(O)—C($R^1$)=$CH_2$, Rf—$SO_2$—N($R^3$)—($C_mH_{2m'}$)—O—C(O)—C($R^1$)=$CH_2$, or Rf—CO—N($R^4$)—($C_mH_{2m'}$)—O—C(C)—C(R)=$CH_2$, wherein Rf, $R^3$, $R^4$, $R^1$, m, and m' are as defined above.

Some compounds of Formula Rf-Q-($C_mH_{2m}$)—O—C(O)—C($R^1$)=$CH_2$, are available, for example, from commercial sources (e.g., 3,3,4,4,5,5,6,6,6-nonafluorohexyl acrylate from Daikin Chemical Sales, Osaka, Japan; 3,3,4,4,5,5,6,6,6-nonafluorohexyl 2-methylacrylate from Indofine Chemical Co., Hillsborough, N.J.; 1H,1H,2H,2H-perfluorooctylacrylate from ABCR, Karlsruhe, Germany; and 2,2,3,3,4,4,5,5-octafluoropentyl acrylate and methacrylate and 3,3,4,4,5,6,6,6-octafluoro-5-(trifluoromethyl)hexyl methacrylate from Sigma-Aldrich, St. Louis, Mo.). Others can be made by known methods (see, e.g., EP1311637 B1, published Apr. 5, 2006, for the preparation of 2,2,3,3,4,4,4-heptafluorobutyl 2-methylacrylate). Compounds wherein Q is —$SO_2N$(R)— can be made according to methods described in, e.g., U.S. Pat. No. 2,803,615 (Albrecht et al.) and U.S. Pat. No. 6,664,354 (Savu et al.), the disclosures of which, relating to free-radically polymerizable monomers and methods of their preparation, are incorporated herein by reference. A perfluoropolyether monomer of formula Rf—(CO)NH$CH_2CH_2$O(CO)C($R^1$)=$CH_2$ can be prepared by first reacting Rf—C(O)—OCH$_3$, for example, with ethanolamine to prepare alcohol-terminated Rf—(CO)NHCH$_2$CH$_2$OH, which can then be reacted with (meth)acrylic acid, (meth)acrylic anhydride, or (meth)acryloyl chloride to prepare the compound of Formula Rf—(CO)NHCH$_2$CH$_2$O(CO)C(R$^1$)=CH$_2$, wherein R$^1$ is methyl or hydrogen, respectively. Other amino alcohols (e.g., amino alcohols of formula NRHXOH) can be used in this reaction sequence. In further examples, an ester of formula Rf—C(O)—OCH$_3$ or a carboxylic acid of formula Rf—C(O)—OH can be reduced using conventional methods (e.g., hydride, for example sodium borohydride, reduction) to an alcohol of formula Rf—CH$_2$OH. The alcohol of formula Rf—CH$_2$OH can then be reacted with methacryloyl chloride, for example, to provide a perfluoropolyether monomer of formula Rf—CH$_2$O(CO)C(R$^1$)=CH$_2$. Examples of suitable reactions and reagents are further disclosed, for example, in the European patent EP 870 778 A1, published Oct. 14, 1998, and U.S. Pat. No. 3,553,179 (Bartlett et al.).

In some embodiments, the oligomer useful in the compositions and methods according to the present disclosure is represented by formula:

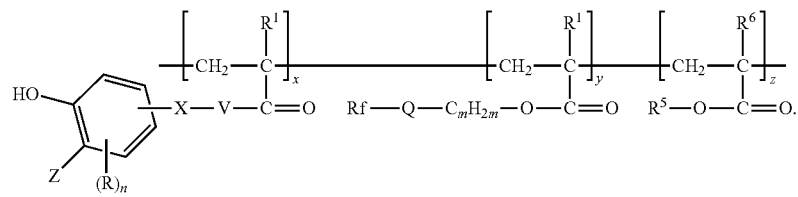

In some embodiments, the oligomer useful in the compositions and methods according to the present disclosure is represented by formula:

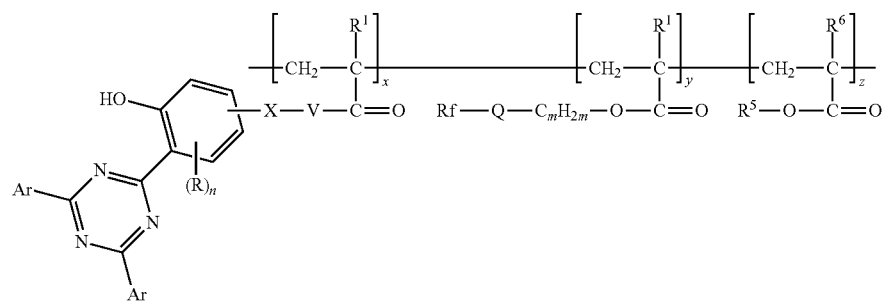

In these formulas, Ar, Z, R, n, X, V, R$^1$, Rf, Q, m, R$^5$, and R$^6$ are as defined above in any of their embodiments, y and z are in a range from 0 to 200, and x is in a range from 1 to 200, with the proviso that y+z is at least 5. However, it should be understood that the representation of the order of the divalent units is for convenience only and not meant to specify that the oligomer is a block copolymer. Random copolymers having first and at least one of second or third divalent units are also included in the representation.

The polymerization reaction for making the oligomers useful in the compositions according to the present disclosure can be carried out in the presence of an added free-radical initiator. Free radical initiators such as those widely known and used in the art may be used to initiate polymerization of the components. Examples of suitable free-radical initiators include azo compounds (e.g., 2,2'-azobisisobutyronitrile (AIBN), 2,2'-azobis(2-methylbutyronitrile), or azo-2-cyanovaleric acid), hydroperoxides (e.g., cumene, tert-butyl or tert-amyl hydroperoxide), dialkyl peroxides (e.g., di-tert-butyl or dicumylperoxide), peroxyesters (e.g., tert-butyl perbenzoate or di-tert-butyl peroxyphthalate), and diacylperoxides (e.g., benzoyl peroxide or lauryl peroxide).

The free-radical initiator may also be a photoinitiator. Examples of useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); 1-hydroxycyclohexyl phenyl ketone; and acylphosphine oxide derivatives and acylphosphonate derivatives (e.g., bis(2,4,6-trimethylbenzoyl)phenylphosphine oxide, diphenyl-2,4,6-trimethylbenzoylphosphine oxide, isopropoxyphenyl-2,4,6-trimethylbenzoylphosphine oxide, or dimethyl pivaloylphosphonate). Many photoinitiators are available, for examples, from BASF, Florham Park, N.J., under the trade designation "IRGACURE". The photoinitiator may be selected so that the wavelength of light required to initiate polymerization is not absorbed by the ultraviolet absorbing group.

In some embodiments, the polymerization reaction is carried out in solvent. The components may be present in the reaction medium at any suitable concentration, (e.g., from about 5 percent to about 80 percent by weight based on the total weight of the reaction mixture). Illustrative examples of suitable solvents include aliphatic and alicyclic hydrocarbons (e.g., hexane, heptane, cyclohexane), aromatic solvents (e.g., benzene, toluene, xylene), ethers (e.g., diethyl ether, glyme, diglyme, and diisopropyl ether), esters (e.g., ethyl acetate and butyl acetate), alcohols (e.g., ethanol and isopropyl alcohol), ketones (e.g., acetone, methyl ethyl ketone and methyl isobutyl ketone), halogenated solvents (e.g., methylchloroform, 1,1,2-trichloro-1,2,2-trifluoroethane, trichloroethylene, trifluorotoluene, and hydrofluoroethers available, for example, from 3M Company, St. Paul, Minn. under the trade designations "HFE-7100" and "HFE-7200"), and mixtures thereof.

Polymerization can be carried out at any temperature suitable for conducting an organic free-radical reaction.

Temperature and solvent for a particular use can be selected by those skilled in the art based on considerations such as the solubility of reagents, temperature required for the use of a particular initiator, and desired molecular weight. While it is not practical to enumerate a particular temperature suitable for all initiators and all solvents, generally suitable temperatures are in a range from about 30° C. to about 200° C. (in some embodiments, from about 40° C. to about 100° C., or from about 50° C. to about 80° C.).

Free-radical polymerizations may be carried out in the presence of chain transfer agents. Typical chain transfer agents that may be used in the preparation compositions according to the present invention include hydroxyl-substituted mercaptans (e.g., 2-mercaptoethanol, 3-mercapto-2-butanol, 3-mercapto-2-propanol, 3-mercapto-1-propanol, and 3-mercapto-1,2-propanediol (i.e., thioglycerol)); poly(ethylene glycol)-substituted mercaptans; carboxy-substituted mercaptans (e.g., mercaptopropionic acid or mercaptoacetic acid): amino-substituted mercaptans (e.g., 2-mercaptoethylamine); difunctional mercaptans (e.g., di(2-mercaptoethyl)sulfide); and aliphatic mercaptans (e.g., octylmercaptan, dodecylmercaptan, and octadecylmercaptan).

Adjusting, for example, the concentration and activity of the initiator, the concentration of each of the reactive monomers, the temperature, the concentration of the chain transfer agent, and the solvent using techniques known in the art can control the molecular weight of the oligomer.

The weight ratio of the first divalent units, second divalent units, and third divalent units in the oligomers disclosed herein in any of their embodiments may vary. For example, the first divalent units may be present in the oligomer in a range from 5 to 50 (in some embodiments, 10 to 40 or 10 to 30) percent, based on the total weight of the oligomer. The second divalent units may be present in a range from 5 to 95 percent, based on the total weight of the oligomer. In some embodiments, the second divalent unit is present in the oligomer in an amount of up to 90, 80, 75, or 70 percent by weight, based on the total weight of the oligomer. Third divalent units may be present in a range from 5 to 90, 20 to 90, 50 to 90, or 50 to 80 percent by weight, based on the total weight of the oligomer. Or there may be no third divalent units in the oligomer. In some embodiments, the oligomer comprises at least one (e.g., at least 2, 3, 4, 5, 6, 7, 8, 9, 10, 15, or at least 20 up to 30, 35, 40, 45, 50, 100, or up to 200) second divalent units and at least one (e.g., at least 2, 3, 4, 5, 6, 7, 8, 9, 10, 15, or at least 20 up to 30, 35, 40, 45, 50, 100, or up to 200) first divalent units. When the third divalent unit is present in an amount of at least 50, 60, 75, or 80 percent, it may be useful to use the oligomer in combination with a second oligomer having a lower weight percentage of third divalent units in the composition according to the present disclosure as described below.

The fluoropolymer is typically a fluorinated thermoplastic obtained by polymerizing one or more types of fully fluorinated or partially fluorinated monomers (e.g., tetrafluoroethylene, vinyl fluoride, vinylidiene fluoride, hexafluoropropylene, pentafluoropropylene, trifluoroethylene, trifluorochloroethylene, and combinations of these in any useful ratio.) Fluoropolymers useful for practicing the present disclosure typically have at least some degree of crystallinity. In some embodiments, fluoropolymers useful for practicing the present disclosure have weight average molecular weights in a range from 30,000 grams per mole to 200,000 grams per mole. In some embodiments, the weight average molecular weight is at least 40,000 or 50,000 grams per mole up to 100,000, 150,000, 160,000, 170,000, 180, 000, or up to 190,000 grams per mole. Useful fluoropolymers include ethylene-tetrafluoroethylene copolymers (ETFE), tetrafluoroethylene-hexafluoropropylene copolymers (FEP), tetrafluoroethylene-hexafluoropropylene-vinylidene fluoride copolymers (THV), polyvinylidene fluoride (PVDF), blends thereof, and blends of these and other fluoropolymers. Another useful fluoropolymer is a PDVF and hexafluoropropylene (HFP) blend in a variety of useful rations (e.g., in a range from 50:50 to 95:5 PVDF:HFP, such as 90:10). In some embodiments, the compositions according to the present disclosure include the fluoropolymer in an amount of at least 50, 60, 70, 80, 85, 90, 95, or 96 percent by weight based on the total weight of the composition. In some embodiments, the compositions according to the present disclosure include the fluoropolymer in an amount greater than 95 percent by weight, based on the total weight of the composition. In some embodiments, the compositions according to the present disclosure include the fluoropolymer in an amount of up to 99.5, 99, or 98 percent by weight based on the total weight of the composition.

The composition comprising the fluoropolymer and the oligomer described above can also include non-fluorinated materials. For example, the composition can include poly(methyl methacrylate) (PMMA) polymer or a copolymer of methyl methacrylate and a $C_2$-$C_5$ alkyl acrylate or methacrylate. The PMMA polymer or copolymer can have a weight average molecular weight of at least 50,000 grams per mole, 75,000 grams per mole, 100,000 grams per mole, 120,000 grams per mole, 125,000 grams per mole, 150,000 grams per mole, 165,000 grams per mole, or 180,000 grams per mole. The PMMA polymer or copolymer may have a weight average molecular weight of up to 500,000 grams per mole, in some embodiments, up to 400,000 grams per mole, and in some embodiments, up to 250,000 grams per mole. In some embodiments, a blend of polyvinylidene fluoride and poly(methyl methacrylate) can be useful.

In some embodiments, oligomers disclosed herein can be useful in films including a blend of PVDF and PMMA. In these embodiments, it is typically useful for the PMMA to be present in the blend in a range from 10% to 25%, in some embodiments, 15% to 25% or 10% to 20% by weight, based on the total weight of PVDF and PMMA. Films that include much higher amounts of PMMA (e.g., greater than 50% by weight, based on the total weight of PVDF and PMMA) typically have poorer photodurability, higher flammability, and poorer flexibility than films that include PVDF blended with 10% to 25% by weight PMMA. As shown in Examples 15 to 17, below, when oligomers disclosed herein are used in a film blend of PVDF and PMMA in which the PMMA to be present in the film blend in a range from 10% to 25% by weight, the retention of the ultraviolet light-absorbing oligomers disclosed herein after exposure to ultraviolet light was surprisingly much superior to a PVDF film including the oligomers but not including PMMA. In some embodiments, the compositions described herein include a blend of a polyvinylidene fluoride and poly(methyl methacrylate) and an ultraviolet light-absorbing oligomer. The ultraviolet light-absorbing oligomer includes a first divalent unit having a pendent ultraviolet absorbing group and at least one second divalent unit as described above in any of its embodiments. The poly(methyl methacrylate) is present in the blend in a range from 10% to 25% by weight, based on the total weight of polyvinylidene fluoride and poly(methyl methacrylate). The percentage of poly(methyl methacrylate) in the blend is relative only to the polyvinylidene fluoride and poly(methyl methacrylate), and does not reflect the presence of oligomer. Also, even when an ultraviolet light-absorbing oligomer disclosed herein includes a second divalent unit derived from methyl methacrylate, the oligomer does not contribute to the percentage of poly(methyl methacrylate).

In some embodiments, compositions described herein have a mixture of different ultraviolet light-absorbing oligomers. In some embodiments, the composition in the form of the extruded film comprises at least two different ultraviolet light-absorbing oligomers in the blend, each ultraviolet light-absorbing oligomers independently comprising the first divalent unit and at least one of the second divalent unit or the third divalent unit. In some embodiments, the composition that includes a ultraviolet light-absorbing oligomer having a triazine group comprises a second, different ultraviolet light-absorbing oligomer in the blend, wherein the second ultraviolet light-absorbing oligomer comprises a divalent unit comprising a second pendent ultraviolet light-absorbing group and at least one of the second divalent unit or the third divalent unit, wherein the second pendent ultraviolet light-absorbing group comprises a triazine, a benzophenone, or a benzotriazole. In either of these embodiments, the second ultraviolet-light absorbing oligomer can comprise at least one (e.g., at least 2, 3, 4, 5, 6, 7, 8, 9, 10, 15, or at least 20 up to 30, 35, 40, 45, 50, 100, or up to 200) second or third divalent units and at least one (e.g., at least 2, 3, 4, 5, 6, 7, 8, 9, 10, 15, or at least 20 up to 30, 35, 40, 45, 50, 100, or up to 200) first divalent units. The first, second, and third divalent units may be as described in any of the embodiments described above for the ultraviolet light-absorbing oligomer. The mixture of two different ultraviolet-light absorbing oligomers may be useful to improve compatibility in some cases, for example. As described in the Examples, below, if an oligomer including a high weight percentage of the third divalent units results in some non-uniformity in color, haze, or continuity in a film made from the composition, including a second oligomer having a majority of second divalent units in the composition can unexpectedly provide a film having uniform color, haze, and caliper.

The composition according to the present disclosure typically includes a blend of the fluoropolymer, the oligomer or oligomers, and any non-fluorinated polymers. By "blend" it is meant that the fluoropolymer and the oligomer according to the present disclosure are not located in separate, distinguishable domains. In other words, the oligomer is typically dispersed throughout the composition; it is not isolated as if in a core-shell polymer particle. In many embodiments, the components of the composition are surprisingly compatible, and the composition appears homogeneous when the components are blended together.

The advantageous compatibility of the oligomer according to the present disclosure and the fluoropolymer in the compositions disclosed herein allows the compositions to be compounded without organic solvent. For example, the oligomer and the fluoropolymer can be melt-processed, compounded, mixed, or milled on conventional equipment. Conveniently, uniform masterbatch compositions can be made that include the ultraviolet light-absorbing oligomer at relatively high concentrations in the fluoropolymer. The masterbatch compositions can be extruded (e.g., in a single- or twin-screw extruder) and formed into films. After extrusion, the compositions can also be pelletized or granulated. The masterbatch compositions can then be extrusion compounded with additional fluoropolymer or non-fluorinated polymer (e.g., PMMA) and formed into films.

Other additives may be included in a UV absorbing layer (e.g., a UV protective layer). Small particle non-pigmentary zinc oxide and titanium oxide can also be used as blocking or scattering additives in a UV absorbing layer. For example, nano-scale particles can be dispersed in polymer or coating substrates to minimize UV radiation degradation. The nano-scale particles are transparent to visible light while either scattering or absorbing harmful UV radiation thereby reducing damage to thermoplastics. U.S. Pat. No. 5,504,134 (Palmer et al.) describes attenuation of polymer substrate degradation due to ultraviolet radiation through the use of metal oxide particles in a size range of about 0.001 micrometer to about 0.2 micrometer in diameter, and more preferably from about 0.01 micrometer to about 0.15 micrometer in diameter. U.S. Pat. No. 5,876,688 (Laundon) describes a method for producing micronized zinc oxide that are small enough to be transparent when incorporated as UV blocking and/or scattering agents in paints, coatings, finishes, plastic articles, cosmetics and the like which are well suited for use in the present invention. These fine particles such as zinc oxide and titanium oxide with particle size ranged from 10-100 nm that can attenuate UV radiation are available, for example, from Kobo Products, Inc., South Plainfield, N.J. Flame retardants may also be incorporated as an additive in a UV protective layer.

In addition to adding UV absorbers, HALS, nano-scale particles, flame retardants, and anti-oxidants to a UV absorbing layer, the UV absorbers, HALS, nano-scale particles, flame retardants, and anti-oxidants can be added to the multilayer optical layers, and any optional durable top coat layers. Fluorescing molecules and optical brighteners can also be added to a UV absorbing layer, the multilayer optical layers, an optional hardcoat layer, or a combination thereof.

The desired thickness of a UV protective layer is typically dependent upon an optical density target at specific wavelengths as calculated by Beers Law. In some embodiments, the UV protective layer has an optical density greater than 3.5, 3.8, or 4 at 380 nm; greater than 1.7 at 390 nm; and greater than 0.5 at 400 nm. Those of ordinary skill in the art recognize that the optical densities typically should remain fairly constant over the extended life of the article in order to provide the intended protective function.

The UV protective layer, and any optional additives, may be selected to achieve the desired protective functions such as UV protection, ease in cleaning, and durability in the solar concentrating mirror. Those of ordinary skill in the art recognize that there are multiple means for achieving the noted objectives of the UV protective layer. For example, additives that are very soluble in certain polymers may be added to the composition. Of particular importance, is the permanence of the additives in the polymer. The additives should not degrade or migrate out of the polymer. Additionally, the thickness of the layer may be varied to achieve desired protective results. For example, thicker UV protective layers would enable the same UV absorbance level with lower concentrations of UV absorbers, and would provide more UV absorber permanence attributed to less driving force for UV absorber migration. One mechanism for detecting the change in physical characteristics is the use of the weathering cycle described in ASTM G155-05a (Oct., 2005), the disclosure of which is incorporated herein by reference, and a D65 light source operated in the reflected mode. Under the noted test, and when the UV protective layer is applied to the article, the article should withstand an exposure of at least 18,700 kJ/m$^2$ at 340 nm before the b* value obtained using the CIE L*a*b* space increases by 5 or less, 4 or less, 3 or less, or 2 or less before the onset of significant cracking, peeling, delamination, or haze. In one exemplary version of the test the article is exposed for 30,000 hours to a Xenon arc lamp weatherometer according to ASTM G155-05a (Oct., 2005), has a change in b* of less than 5 units when measured with the spectrophotometer (available from Perkin-Elmer, Inc., Waltham, Mass., under the trade designation "LAMBDA 950").

Multi-layer optical films described herein are useful, for example, as a UV protective covering. For example, the present disclosure provides a composite article comprising a substrate having a major surface, and a multi-layer optical film described herein on at least a portion of the major surface; a vehicle (e.g., an automobile or truck) window comprising a multi-layer optical film described herein; commercial graphic (i.e., an image for premise signage or fleets meant to convey a brand or promotional message); a light assembly comprising a multi-layer optical film described herein; a sign comprising a multi-layer optical film described herein; an LCD comprising a multi-layer optical film described herein; a building exterior comprising a multi-layer optical film described herein; and an photovoltaic module (e.g., a flexible module) comprising a multi-layer optical film described herein.

Some embodiments of light transparent fluoropolymer films described herein, have a thickness in a range from 5 micrometers to 500 micrometers (in some embodiments, in a range from 25 micrometers to 1000 micrometers). In some embodiments, the films are monolayer films. In some embodiments, the films are multilayer films (e.g., at least 5, 10, 25, 50, 100, 500, or even at least 1000) layers.

In some embodiments, the transparent fluoropolymer films have an anti-reflective, structured (e.g., prismatic riblets; in some embodiments, nanostructured) major surface. The structured surface can be provided by techniques known in the art including extrusion replication, embossing, and casting, followed by, if needed, photo or thermal curing. A procedure for making structured surfaces is to heat a polymeric film and then contact it with an embossing roll or belt having a desired structured surface thus imparting the negative of the surface pattern into the polymeric film.

In general, the extrusion replication procedure utilizes a tool that will impart the negative structure in the polymer surface. The tooling can be of a variety of forms and materials. Commonly the form of the tooling will either be a sheet, roll, belt or roll of surface structured film. The tooling is generally constructed of material that falls either into the category of metal or polymer but could potentially include ceramic or other suitable material. For metal tools, the metal is generally diamond-machined, embossed, knurled, sandblasted, etc. to form the surface structure. The structured polymer surface is generally formed by extrusion replication where a thermoplastic resin such as PVDF is extruded using standard extrusion equipment and fed through a die and into a nip with a machined metal tool roll and a rubber roll. The molten polymer is quenched while in contact with the tool surface which then releases from the tool roll and is wound on a roll.

Exemplary structured layers include those having a structured surface comprising a series of structures. The structured layer may be a single material or may be a multilayer construction, where the structured layer comprises one material formulation, and a base film and adhesive comprise different material formulations. Additionally, the film and adhesive layers could themselves comprise multiple layers. Generally, the structured layer has a structured surface wherein, wherein a substantial portion of reflected light intersects another structure on the surface. In some embodiments, the series of structures comprises a series of essentially parallel peaks separated by a series of essentially parallel valleys. In cross-section the structured layer may assume a variety of wave forms. For example, the cross section may assume a symmetric saw tooth pattern in which each of the peaks are identical as are each of the valleys; a series of parallel peaks that are of different heights, separated by a series of parallel valleys; or a saw tooth pattern of alternating, parallel, asymmetric peaks separated by a series of parallel, asymmetric valleys. In some embodiments, the peaks and valleys are continuous and in other embodiments a discontinuous pattern of peaks and valleys is also contemplated. Thus, for example, the peaks and valleys may terminate for a portion of the article. The valleys may either narrow or widen as the peak or valley progresses from one end of the article to the other. Still further, the height and/or width of a given peak or valley may change as the peak or valley progresses from one end of the article to the other.

In some embodiments, the structured surface is opposite the energy conversion device, and the structured surface is antireflective. An antireflective, structured surface means, for the purpose of the present disclosure, that % reflection, averaged over all angles of incidence, is less than it would be on a corresponding flat surface, for example, is less than 50% of the reflection off the flat surface (in some embodiments less than 60%, 70%, or even less than 80% of the reflection off the flat surface).

The dimensions of the peaks generally have a height of at least about 10 micrometers (0.0004 inch). In some embodiments, peaks have a height up to about 250 micrometers (0.010 inch). In one embodiment, for example, the peaks are at least about 20 micrometers (0.0008 inch) high, and in another exemplary embodiment, the peaks are up to about 150 micrometers (0.006 inch) high. The peak-to-peak spacing between adjacent peaks is generally at least about 10 micrometers (0.0004 inch). In another embodiment, the spacing is up to about 250 micrometers (0.010 inch). In one embodiment, the spacing is at least about 20 micrometers (0.0008 inch), and in some embodiments, the spacing is as much as about 150 micrometers (0.006 inch). The included angle between adjacent peaks can also vary. The valleys may be flat, round, parabolic, or V-shaped. The peaks are generally V-shaped and have an apex angle of less than 60 degrees (in some embodiments less than 50 degrees, or even less than 40 degrees). The present disclosure is also directed to peaks having a radius of curvature at the tip, and such an embodiment has an apex angle measured by the best fit line to the sides.

In some embodiments, the series of structures are non-uniform structures. For example, the structures differ in height, base width, pitch, apex angle, or other structural aspect. In such embodiments, the slope of the structures from the plane of the surface averages over the surface less than 30 degrees from normal. In other embodiments, for example, the structures are substantially symmetric in one dimension around a perpendicular to the surface.

Figure 5:
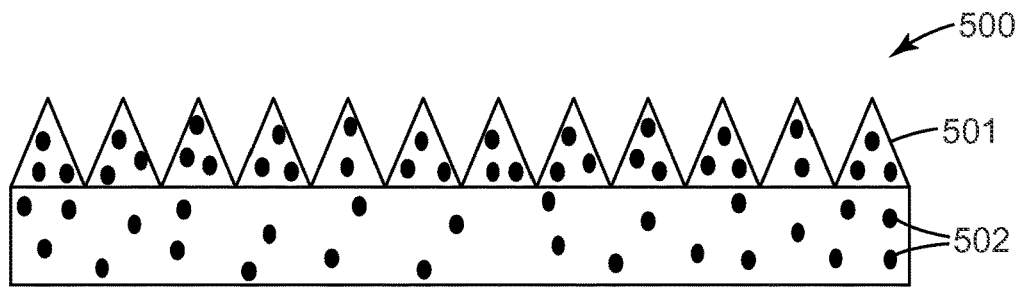
FIG. 5 is a cross-sectional view of an exemplary fluoropolymer film having a structured surface.

Referring to FIG. 5, exemplary surface structured film 500 comprises a surface structured fluoropolymer layer 501 and fluoropolymer layer 502 containing at least one of alkali metal cation, alkali metal and a corresponding anion, alkaline earth metal cation, or alkaline earth metal cation and a corresponding anion 502. As shown there are two separate layers, but it is also within the scope of the present disclosure to have 501 and 502 be a single layer.

Figure 6:
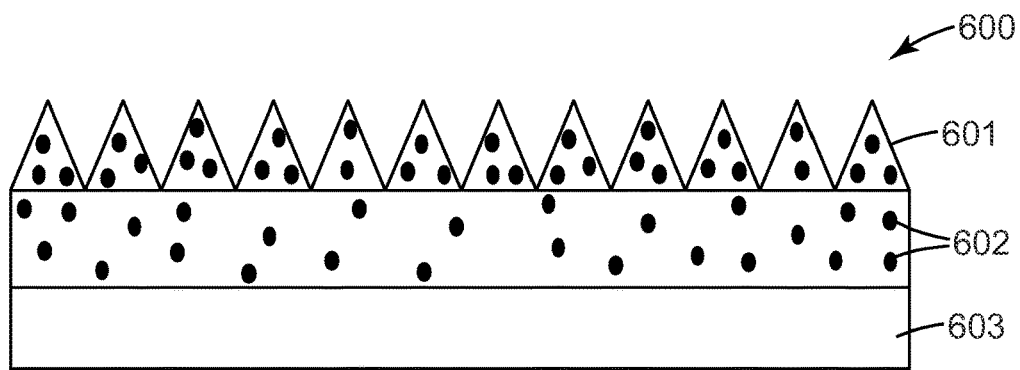
FIG. 6 is a cross-sectional view of an exemplary surface structured fluoropolymer film with an adhesive layer.

Referring to FIG. 6, exemplary surface structured film 600 comprises surface structured fluoropolymer 601 and at least one of alkali metal cation, alkali metal and a corresponding anion, alkaline earth metal cation, or alkaline earth metal cation and a corresponding anion 602 and adhesive layer 603. As shown there are two separate layers, but it is also within the scope of the present disclosure to have 601 and 602 be a single layer.

Figure 7:
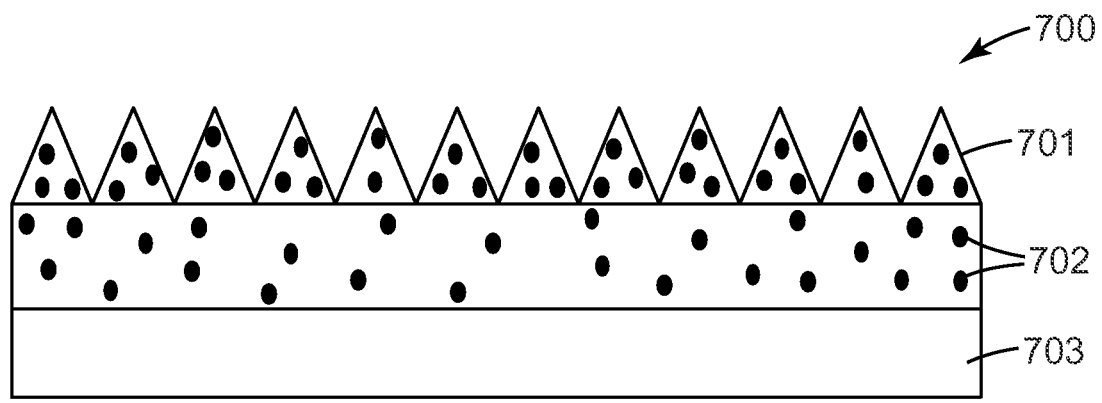
FIG. 7 is a cross-sectional view of an exemplary multilayer surface structured fluoropolymer film with a second polymer layer.

Referring to FIG. 7, exemplary surface structured film 700 comprises surface structured fluoropolymer layer 701 and at least one of alkali metal cation, alkali metal and a corresponding anion, alkaline earth metal cation, or alkaline earth metal cation and a corresponding anion 702, and another polymer layer 703 which in turn comprises ultraviolet absorbers. As shown there are two separate layers, but it is also within the scope of the present disclosure to have 701 and 702 be a single layer.

Figure 8:
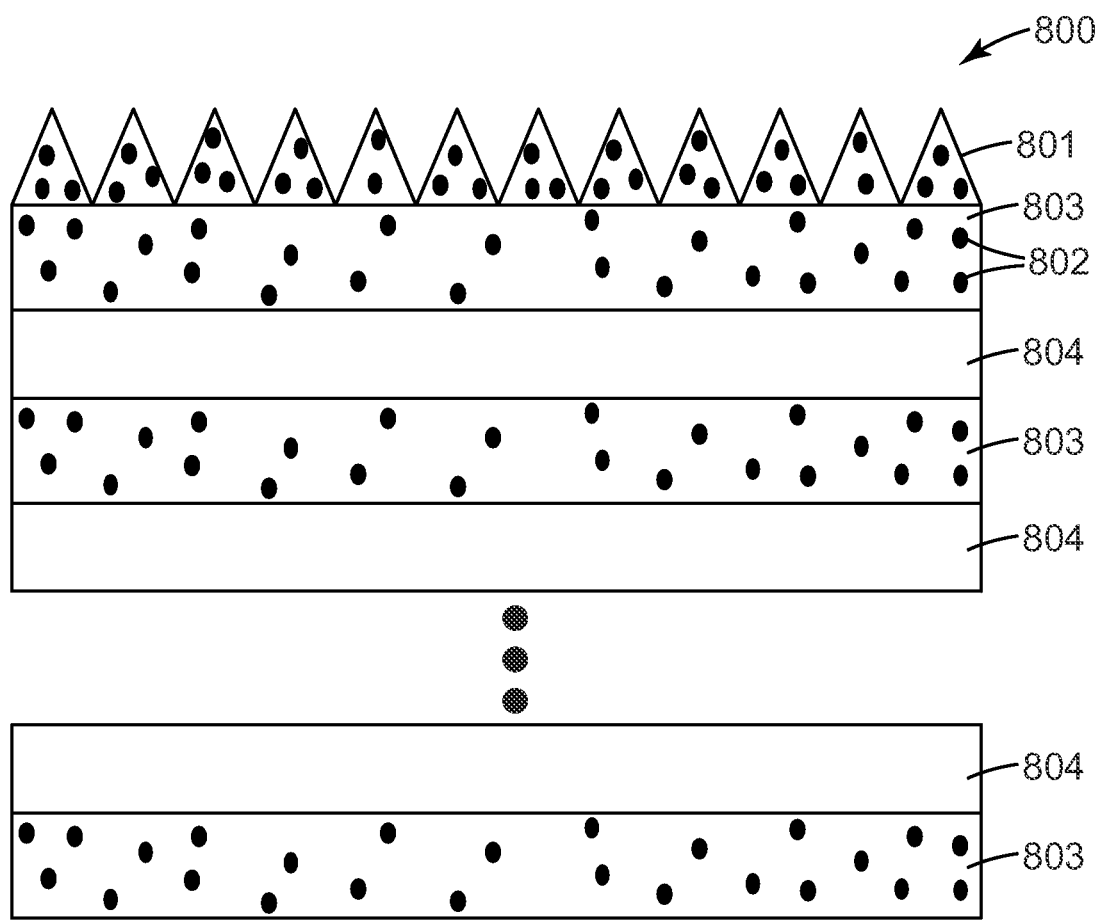
FIG. 8 is a cross-sectional view of an exemplary multilayer optical film with a structured surface comprising hundreds of alternating layers of fluoropolymer with hundreds of alternating layers of another polymer. Not all layers are shown.

Referring to FIG. 8, exemplary surface structured multilayer optical film 800 comprises a surface structured fluoropolymer 801 and at least one of alkali metal cation, alkali metal and a corresponding anion, alkaline earth metal cation, or alkaline earth metal cation and a corresponding anion 802, and alternating fluoropolymer optical layers 803 which in turn comprises at least one of alkali metal cation, alkali metal and a corresponding anion, alkaline earth metal cation, or alkaline earth metal cation and a corresponding anion 802, and alternating layers 804 of a second optical polymer. As shown there are two separate layers, but it is also within the scope of the present disclosure to have 801 and 802 be a single layer.

Figure 9:
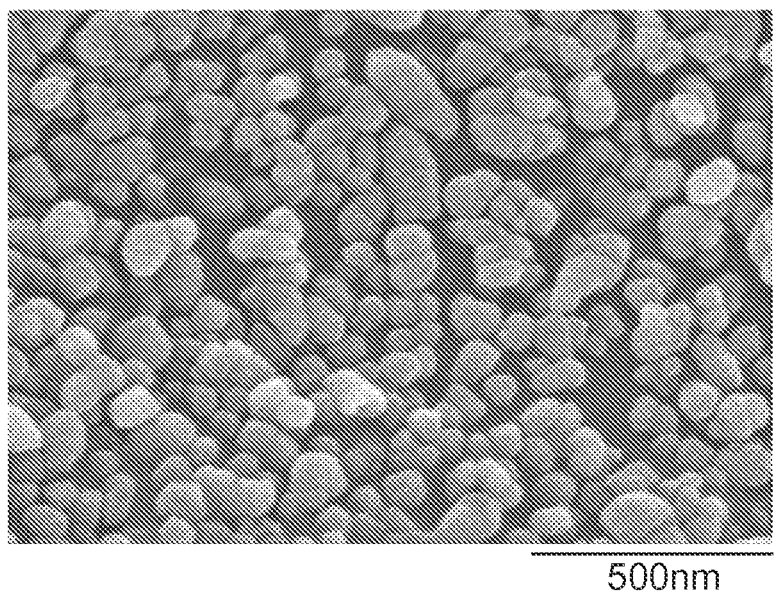
FIG. 9 is a photoelectromicrograph image of alkali earth metal nanoparticles coated onto a fluoropolymer pellet.

FIG. 9 shows a scanning electron microscopy image of alkali earth metal nanoparticles that have been spray coated onto a fluoropolymer pellet.

Long term exposure to other environmental conditions such as heat and UV radiation exposure from the sun can also cause degradation of the structured surface of a film. For example, many polymeric organic materials are susceptible to breaking down upon repeated exposure to UV radiation. Weatherability for light energy absorbing devices such as, for example, a solar energy conversion device is generally measured in years, because it is desirable that the materials be able to function for years without deterioration or loss of performance. It is desirable for the materials to be able to withstand up to 20 years of outdoor exposure without significant loss of optical transmission or mechanical integrity. Typical polymeric organic materials are not able to withstand outdoor exposure without loss of optical transmission or mechanical integrity for extended periods of time, such as 20 years. In at least some embodiments, the structured face is expected to exhibit dirt resistance and/or mechanical durability in the range of from at least about 5 years to at least about 20 years, and possibly longer (e.g., at least about 25 years). In addition, because it is made of a UV stable polymeric material, the structured face can exhibit long term UV stability of at least about 15 years, about 20 years, or even greater than 25 years.

Exemplary uses of light transparent fluoropolymer compositions described herein include as films (e.g., solar reflective films, solar transparent frontside photovoltaic films, commercial graphic film, and tubing (e.g., transparent tubing for medical)).

Exemplary Embodiments

1A. A light transparent fluoropolymer composition having less than 2 percent haze, comprising at least one of alkali metal (e.g., lithium, sodium, and potassium) cation and a corresponding anion (e.g., $CO_3, OH, OOCCH_3$) or alkaline earth metal cation (e.g., calcium, magnesium, strontium, and barium) and a corresponding anion (e.g., $CO_3, OH, OOCCH_3$), wherein at least 0.01 percent by weight of the alkali metal cations and alkaline earth metal cations are present, based on the total weight of the composition, and wherein the light transparent fluoropolymer has at least 90 (in some embodiments, at least 95, 96, 97, 98, or even greater than 99) % visible light transmission.

2A. The light transparent fluoropolymer composition of Exemplary Embodiment 1A, wherein at least 0.05 (in some embodiments, at least 0.075, or even at least 0.1; in some embodiments, up to 1; in some embodiments, in a range from 0.05 to 1, 0.075 to 1, or even, 0.1 to 1) percent by weight of the alkali metal cations and alkaline earth metal cations are present, based on the total weight of the composition.

3A. The light transparent fluoropolymer composition of any preceding A Exemplary Embodiment, wherein the fluoropolymer is at least one of tetrafluoroethylene (TFE), vinylidene fluoride (VDF), vinyl fluoride (VF), hexafluoropropylene (HFP), chlorotrifluoroethylene (CTFE), fluoroalkyl vinyl ethers, fluoroalkoxy vinyl ethers, fluorinated styrenes, fluorinated siloxanes, hexafluoropropylene oxide (HFPO), homopolymers of TFE (e.g., PTFEs), copolymers of ethylene and TFE copolymers (e.g., ETFEs); copolymers of TFE, HFP, and VDF (e.g., THVs); homopolymers of VDF (e.g., PVDFs); copolymers of VDF (e.g., coVDFs); homopolymers of VF (e.g., PVFs); copolymers of HFP and TFE (e.g., FEPs); copolymers of TFE and propylene (e.g., TFEPs); copolymers of TFE and (perfluorovinyl) ether (e.g., PFAs); copolymers of TFE, (perfluorovinyl) ether, and (perfluoromethyl vinyl) ether (e.g., MFAs); copolymers of HFP, TFE, and ethylene (e.g., HTEs); homopolymers of chlorotrifluoroethylene (e.g., PCTFE); copolymers of ethylene and CTFE (e.g., ECTFEs); homopolymers of HFPO (e.g., PHFPO); homopolymers of 4-fluoro-(2-trifluoromethyl)styrene; copolymers of TFE and norbornene; copolymers of HFP and VDF; or combinations thereof, copolymers of tetrafluoroethylene, hexafluoropropylene, and vinylidene fluoride sold under the trade designation "DYNEON THV 220", "DYNEON THV 230", "DYNEON THV 500", "DYNEON THV 500G", "DYNEON THV 510D", "DYNEON THV 610", "DYNEON THV 815", "DYNEON THVP 2030G" by Dyneon LLC; copolymers of tetrafluoroethylene, hexafluoropropylene, and ethylene sold under the trade designation "DYNEON HTE 1510" and "DYNEON HTE 1705" by Dyneon LLC, and "NEOFLON EFEP" by Daikin Industries, Ltd.; copolymers of tetrafluoroethylene, hexafluoropropylene, and ethylene sold under the trade designation "AFLAS" by Asahi Glass Co., Ltd.; copolymers of tetrafluoroethylene and norbornene sold under the trade designation "TEFLON AF" by E.I. du Pont de Nemours and Co.; copolymers of ethylene and tetrafluoroethylene sold under the trade designation "DYNEON ET 6210A" and "DYNEON ET 6235" by Dyneon LLC, "TEFZEL ETFE" by E.I. du Pont de Nemours and Co., and "FLUON ETFE" by Asahi Glass Co., Ltd.; copolymers of ethylene and chlorotrifluoroethylene sold under the trade designation "HALAR ECTFE" by Solvay Specialty Polymers; homopolymers of vinylidene fluoride sold under the trade designation "DYNEON PVDF 1008" and "DYNEON PVDF 1010" by Dyneon LLC; copolymers of polyvinylidene fluoride sold under the trade designation "DYNEON PVDF 11008", "DYNEON PVDF 60512", "DYNEON FC-2145" (a copolymer of HFP and VDF) by Dyneon LLC, homopolymers of vinyl fluoride sold under the trade designation "DUPONT TEDLAR PVF" by E.I. du Pont de Nemours and Co.; MFAs sold under the trade designation "HYFLON MFA" by Solvay Specialty Polymers or combinations thereof.

4A. The light transparent fluoropolymer composition of any preceding A Exemplary Embodiment, further comprising polymethylmethacrylate (PMMA).

5A. The light transparent fluoropolymer composition of any preceding A Exemplary Embodiment, further comprising at least one UV absorber (e.g., benzotriazole compound, 5-trifluoromethyl-2-(2-hydroxy-3-alpha-cumyl-5-tert-octylphenyl)-2H-benzotriazole (sold under the trade designation "CGL-0139" from BASF Corporation, Florham Park, N.J.). Other preferred benzotriazoles include 2-(2-hydroxy-3,5-di-alpha-cumylphenol)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenol)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole). Further preferred RUVA includes 2-(4,6-diphenyl-1-3,5-triazin-2-yl)-5-hexyloxy-phenol). Exemplary UV absorbers include those available from BASF Corporation under the trade designations "TINUVIN 1600", "TINUVIN 1577," "TINUVIN 900," and "TINUVIN 777").

6A. The light transparent fluoropolymer composition of any preceding A Exemplary Embodiment, further comprising at least one HALS light stabilizers (e.g., "TINUVIN 123" from BASF Corp.: "OMNISTAB LS292" from ICG Specialty Chemicals: "OMNISTAB LS944" from ICG Specialty Chemicals: "SABOSTAB 119" and "SABOSTAB 94" from Sabo S.p.A., "UVINUL 4092" from BASF Corp., N.J.: "BLS 292" from Mayzo; and "LOWILITE" from Addivant).

7A. The light transparent fluoropolymer composition of any preceding A Exemplary Embodiment, further comprising at least one dye.

8A. A light transparent fluoropolymer film comprising the light transparent fluoropolymer composition of any preceding A Exemplary Embodiment.

9A. The light transparent fluoropolymer film of Exemplary Embodiment 8A having a thickness in a range from 5 micrometers to 500 micrometers (in some embodiments, in a range from 25 micrometers to 1000 micrometers).

10A. The light transparent fluoropolymer film of either Exemplary Embodiment 8A or 9A that is a monolayer film.

11A. The light transparent fluoropolymer film of either Exemplary Embodiment 8A or 9A that is a multilayer film (e.g., at least 5, 10, 25, 50, 100, 500, or even at least 1000) layers.

12A. The light transparent fluoropolymer film of any of Exemplary Embodiments 8A to 11A having an anti-reflective, structured (e.g., prismatic riblets; in some embodiments, nanostructured) major surface.

13A. The light transparent fluoropolymer film of any of Exemplary Embodiments 8A to 12A that is extensible at least 25° C. (e.g., to conform to a 3D shape).

14A. The film of any of Exemplary Embodiments 8A to 13A that is a commercial graphic film.

15A. A tube comprising the light transparent fluoropolymer composition of any of Exemplary Embodiments 1A to 7A.

1B. An article having a surface structured light transparent fluoropolymer film comprising at least one of alkali metal (e.g., lithium, sodium, and potassium) cation, alkali metal cation (e.g., lithium, sodium, and potassium) and a corresponding anion (e.g., $CO_3$, OH, $OOCCH_3$), alkaline earth metal cation (e.g., calcium, magnesium, strontium, and barium), or alkaline earth metal cation (e.g., calcium, magnesium, strontium, and barium) and a corresponding anion (e.g., $CO_3$, OH, $OOCCH_3$), wherein the surface structured light transparent fluoropolymer film has at least 95 (in some embodiments, at least 96, 97, 98, or even greater than 99) % visible light transmission.

2B. The article of Exemplary Embodiment 1B, wherein at least 0.05 (in some embodiments, at least 0.075, or even at least 0.1; in some embodiments, up to 1; in some embodiments, in a range from 0.05 to 1, 0.075 to 1, or even, 0.1 to 1) percent by weight of the alkali metal and alkaline earth metal present, based on the total weight of the surface structured light transparent fluoropolymer.

3B. The article of any preceding B Exemplary Embodiment, wherein the fluoropolymer is at least one of tetrafluoroethylene (TFE), vinylidene fluoride (VDF), vinyl fluoride (VF), hexafluoropropylene (HFP), chlorotrifluoroethylene (CTFE), fluoroalkyl vinyl ethers, fluoroalkoxy vinyl ethers, fluorinated styrenes, fluorinated siloxanes, hexafluoropropylene oxide (HFPO), homopolymers of TFE (e.g., PTFEs), copolymers of ethylene and TFE copolymers (e.g., ETFEs); copolymers of TFE, HFP, and VDF (e.g., THVs); homopolymers of VDF (e.g., PVDFs); copolymers of VDF (e.g., coVDFs); homopolymers of VF (e.g., PVFs); copolymers of HFP and TFE (e.g., FEPs); copolymers of TFE and propylene (e.g., TFEPs); copolymers of TFE and (perfluorovinyl) ether (e.g., PFAs); copolymers of TFE, (perfluorovinyl) ether, and (perfluoromethyl vinyl) ether (e.g., MFAs); copolymers of HFP, TFE, and ethylene (e.g., HTEs); homopolymers of chlorotrifluoroethylene (e.g., PCTFE); copolymers of ethylene and CTFE (e.g., ECTFEs); homopolymers of HFPO (e.g., PHFPO); homopolymers of 4-fluoro-(2-trifluoromethyl)styrene; copolymers of TFE and norbornene; copolymers of HFP and VDF; or combinations thereof, copolymers of tetrafluoroethylene, hexafluoropropylene, and vinylidene fluoride or combinations thereof.

4B. The article of any preceding B Exemplary Embodiment, further comprising polymethylmethacrylate (PMMA).

5B. The article of any preceding B Exemplary Embodiment, further comprising at least one UV absorber (e.g., benzotriazole compound, 5-trifluoromethyl-2-(2-hydroxy-3-alpha-cumyl-5-tert-octylphenyl)-2H-benzotriazole (sold under the trade designation "CGL-0139" from BASF Corporation, Florham Park, N.J.)). Other preferred benzotriazoles include 2-(2-hydroxy-3,5-di-alpha-cumylphenol)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenol)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole.

6B The article of any preceding B Exemplary Embodiment, further comprising at least one HALS light stabilizers (e.g., "TINUVIN 123" from BASF Corp.: "OMNISTAB LS292" from ICG Specialty Chemicals; "OMNISTAB LS944" from ICG Specialty Chemicals: "SABOSTAB 119" and "SABOSTAB 94" from Sabo S.p.A., "UVINUL 4092" from BASF Corp.; "BLS 292" from Mayzo, Suwanee, Ga.: and "LOWILITE" from Addivant).

7B. The article of any preceding B Exemplary Embodiment, further comprising at least one dye.

8B. A article comprising the light transparent fluoropolymer composition of any preceding B Exemplary Embodiment.

9B. The article of Exemplary Embodiment 8B having a thickness in a range from 5 micrometers to 500 micrometers (in some embodiments, in a range from 25 micrometers to 1000 micrometers).

10B. The article of either Exemplary Embodiment 8B or 9B that is a monolayer film.

11B. The article of either Exemplary Embodiment 8B or 9B that is a multilayer film (e.g., at least 5, 10, 25, 50, 100, 500, or even at least 1000) layers.

12B. The article of any of Exemplary Embodiments 8B to 11B that is extensible at at least 25° C. (e.g., to conform to a 3D shape).

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Test Methods

Elongation

Elongation (extensibility) of the films at approximately 25° C. were measured with an Tensile Tester (obtained under the trade designation "INSTRON" from Instron, Norwood, Mass.) according to ASTM D882, the disclosure of which is incorporated herein by reference, using the following parameters and settings.
EM system: 3345
Load cell: 91 kg (200 lbs.)
Grips: 91 kg (200 lbs.) pneumatic side action grips with 2.5 cm (1 in.)×2.5 cm (1 in.) rubber-coated faces
Grip pressure: 620 kPa (90 psi)
Gauge length (grip separation): 5.1 cm (2.0 in.)
Test speed: 51 cm/min. (20 in./min.)
Specimen dimensions: 2.5 cm (1 in.) width×12.7 cm (5 in.) length Light transmission and haze of the films were measured with a haze meter obtained under the trade designation "HAZEGARD PLUS" from BYK-Gardner GMBH, Geretsried, Germany.

Comparative Example C1

Fluoropolymer (obtained from under the trade designation "THV220" from Dyneon, LLC, Oakdale, Minn.) pellets were fed into a 25 mm twin screw extruder (obtained under the trade designation "WERNER & PHLEIDERER") at 2.7 kg/hr. (6 lb./hr. and extruded through a conventional coat hanger design film die onto a chilled metal casting wheel (20° C.) at 6.1 meters/min. (20 fpm). The resulting film had a thickness of 25 micrometers (1 mil) with a haze level of 0.3% and light transmission of 96.7% measured with the a haze meter ("HAZEGARD PLUS"). The hydrogen fluoride gas level measured at the lip of the extrusion film die was 5 ppm. An HF gas meter (obtained from Analytical Technology Inc., Collegeville, Pa.) was used for the measurement.

Comparative Example C2

Fluoropolymer ("THV220") pellets were dry blended in a drum tumbler with 0.2 wt. % calcium carbonate (obtained under the trade designation "SOCAL31" from Solvay, Brussels, Belgium) at 10 rpm for 5 minutes. The mixture of powder coated pellets was fed into a 25 mm twin screw extruder ("WERNER & PHLEIDERER") at 2.7 kg/hr. (6 lb./hr.) and extruded through a conventional coat hanger design film die onto a chilled casting wheel at 6.1 meters/min (20 fpm). The resulting film had a thickness of 25 micrometers (1 mil) with a haze level of 3.2% and light transmission of 96.0% measured with a haze meter ("HAZE-GARD PLUS BYK"). The hydrogen fluoride gas level measured at the lip of the extrusion film die was 0 ppm. An HF gas meter (obtained from Analytical Technology Inc., Collegeville, Pa.) was used for the measurement.

Example 1

Fluoropolymer ("THV220") was dry blended in a drum tumbler with 0.1 wt. % calcium carbonate ("SOCAL31") at 10 rpm for 5 minutes. The mixture of powder coated pellets was fed into a 25 mm twin screw extruder ("WERNER & PHLEIDERER") at 2.7 kg/hr. (6 lb./hr.) and extruded through a conventional coat hanger design film die onto a chilled casting wheel at 6.1 meters/min. (20 fpm). The resulting film had a thickness of 25 micrometers (1 mil) with a haze level of 1.8% and light transmission of 96.5% measured with a haze meter ("HAZEGARD PLUS BYK"). The hydrogen fluoride gas level measured at the lip of the extrusion film die was 0 ppm. An HF gas meter (obtained from Analytical Technology Inc., Collegeville, Pa.) was used for the measurement.

Example 2

An aqueous solution containing 0.1 wt. % calcium carbonate was injected into a 25 mm twin screw extruder ("WERNER & PHLEIDERER") at a rate of 1.4 kg/hr. (3 lbs./hr.) through a barrel injection port downstream of the polymer melting section. The feed rate of the fluoropolymer ("THV220") pellets was 2.7 kg/hr. (6 lbs./hr.). The steam generated from the evaporating water was vented out of a second twin screw extruder port after being mixed with the molten fluoropolymer ("THV220"). The resulting mixture of fluoropolymer ("THV220") and 0.05 wt. % calcium carbonate was extruded into a strand and cut into pellets using a conventional strand die and pelletizer. No hydrogen fluoride gas was measured at the polymer strand die. The fluoropolymer ("THV220") pellets containing 0.05 wt. % calcium carbonate were hot pressed into a 25 micrometer (1 mil) film under pressure at 249° C. (480° F.). The resulting film had a haze level of 1.5% and light transmission of 96.5% measured with a haze meter ("HAZEGARD PLUS BYK").

Example 3

A fluoropolymer film was prepared as in Example 2, except an aqueous solution containing 0.1 wt % potassium carbonate was injected into extruder and melt mixed with the fluoropolymer ("THV220") pellets. The resulting mixture of fluoropolymer ("THV220") and 0.05 wt. % potassium carbonate was extruded into a strand and cut into pellets. No hydrogen fluoride gas was measured at the polymer strand die. The fluoropolymer ("THV220") pellets containing 0.05 wt. % potassium carbonate were hot pressed into a 25 micrometer (1 mil) film under pressure at 249° C. (480° F.). The resulting film had a haze level of 1.1% and light transmission of 96.6% measured with a haze meter ("HAZEGARD PLUS BYK").

Example 4

A fluoropolymer film was prepared as in Example 2, except the fluoropolymer pellets were prepared using the following technique. 4.54 kg (10 lbs.) of fluoropolymer ("THV220") resin pellets were loaded into a fluidized bed spray coating process (obtained under the trade designation "VF3" from Freund-Vector, Marion, Iowa) and fluidized with 150 cfm air flow heated to 90° C. 4.54 kg (10 lbs.) of aqueous solution containing 0.1 wt. % calcium carbonate nanoparticles was sprayed through an atomizing spray nozzle at 1.8 kg/hr. (4 lbs./hr.) under 414 kPa (60 psi) atomization spray head air pressure. Additional air was introduced through the accelerator portion of the spray nozzle at 414 kPa (60 psi) to disperse the atomized aqueous solution droplets into the fluidized fluoropolymer ("THV220") pellets. The fluoropolymer ("THV220") pellets coated with calcium carbonate nanoparticles were analyzed by Field-emission scanning electron microscopy (FSEM) and had an average particle diameter of less than 100 nm.

The calcium carbonate nanoparticle coated fluoropolymer pellets were then extruded as in Example 1. The resulting film had a haze level of 0.85% and light transmission of 96.7% measured with a haze meter ("HAZEGARD PLUS BYK"). No hydrogen fluoride gas was measured at the film die exit.

Example 5

A fluoropolymer film was prepared as in Example 4, except 483 kPa (70 psi) atomization spray head air pressure was used. Additional air was introduced through the accelerator portion of the spray nozzle at 483 kPa (70 psi) to disperse the atomized aqueous solution droplets into the fluidized fluoropolymer ("THV220") pellets. Fluoropolymer ("THV220") pellets coated with calcium carbonate nanoparticles were analyzed by FSEM to have an average particle diameter of less than 100 nm. The calcium carbonate nanoparticle coated fluoropolymer pellets were then extruded as in Example 4. The resulting film had a haze level of 0.7% and light transmission of 96.7% measured with a haze meter ("HAZEGARD PLUS BYK"). No hydrogen fluoride gas was measured at the lip of the extrusion die.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A multilayer optical film comprising at least 5 layers, wherein the optical film comprises an optical stack with alternating film layers of:
    a first film layer comprising a light transparent fluoropolymer composition wherein the fluoropolymer composition comprises at least one fluoropolymer and 0.01 to 1 percent by weight, based on the total weight of the fluoropolymer composition, of at least one of:
    an alkali metal cation,
    an alkali metal and a corresponding anion,
    an alkaline earth metal cation, and
    an alkaline earth metal and a corresponding anion,
    wherein the first film layer has at least 95% visible light transmission and less than 2 percent haze; and
    a second polymeric film layer.

2. The optical film of claim 1, wherein 0.05 to 1 percent by weight of the alkali metal ions and alkaline earth metal ions are present in the fluoropolymer composition, based on the total weight of the composition.

3. The optical film of claim 1, wherein the fluoropolymer is at least one of homopolymers of tetrafluoroethylene, copolymers of ethylene and tetrafluoroethylene copolymers; copolymers of tetrafluoroethylene, hexafluoropropylene, and vinylidene fluoride; homopolymers of vinylidene fluoride; copolymers of vinylidene fluoride; homopolymers of vinyl fluoride; copolymers of hexafluoropropylene and tetrafluoroethylene; copolymers of tetrafluoroethylene and propylene; copolymers of tetrafluoroethylene and (perfluorovinyl) ether; copolymers of tetrafluoroethylene, (perfluorovinyl) ether, and (perfluoromethyl vinyl) ether; copolymers of hexafluoropropylene, tetrafluoroethylene, and ethylene; homopolymers of chlorotrifluoroethylene; copolymers of ethylene and chlorotrifluoroethylene; homopolymers of hexafluoropropylene oxide; homopolymers of 4-fluoro-(2-trifluoromethyl)styrene; copolymers of tetrafluoroethylene and norbornene; or copolymers of hexafluoropropylene and vinylidene fluoride.

4. The optical film of claim 1, wherein the fluoropolymer composition further comprises polymethylmethacrylate.

5. The optical film of claim 1, wherein the fluoropolymer composition further comprises at least one ultraviolet absorber.

6. The optical film of claim 1, wherein the fluoropolymer composition further comprises at least one hindered amine light stabilizer.

7. The optical film of claim 1, wherein the optical film has an anti-reflective, structured major surface.

8. The optical film of claim 1, wherein the optical film has an elongation at break of 10% to 200% at 25° C.

9. The optical film of claim 1, wherein the second polymeric film layer is chosen from polymethylmethacrylate (PMMA), polyethyl methacrylate (PEMA), copolymers of PMMA (CoPMMA), polyolefin copolymers, functionalized polyolefins, and combinations thereof.

10. The optical film of claim 1, wherein the alkali metal is chosen from lithium, sodium, and potassium.

11. The optical film of claim 1, wherein the alkaline earth metal is chosen from calcium, magnesium, strontium and barium.

12. The optical film of claim 10, wherein the alkaline earth metal is calcium, and the corresponding anion is chosen from $CO_3$, OH, and $OOCCH_3$.

13. The optical film of claim 12, wherein the alkaline earth metal and corresponding anion comprise $CaCO_3$.

14. The optical film of claim 12, wherein the alkaline earth metal and corresponding anion is $CaCO_3$.

15. The optical film of claim 1, further comprising protective, non-optical skin layers on opposed major surfaces of the optical stack.

16. The optical film of claim 15, wherein the non-optical skin layers comprise an ultraviolet absorber.

17. The optical film of claim 1, wherein the optical stack comprises at least 50 layers.

18. The optical film of claim 1, wherein the optical stack comprises at least 100 layers.

19. A multilayer optical film comprising at least 100 layers, wherein the optical film comprises an optical stack with alternating film layers of:
    a first film layer comprising a fluoropolymer composition comprising at least one fluoropolymer and 0.01 to 1 percent by weight, based on the total weight of the fluoropolymer composition, of an alkaline earth metal chosen from calcium, magnesium, strontium and barium, and a corresponding anion chosen from $CO_3$, OH, and $OOCCH_3$, and wherein the first film layer has at least 95% visible light transmission and less than 2 percent haze; and
    a second polymeric film layer chosen from polymethylmethacrylate (PMMA), polyethyl methacrylate (PEMA), copolymers of PMMA (CoPMMA), polyolefin copolymers, functionalized polyolefins, and combinations thereof.

20. The optical film of claim 19, wherein the alkaline earth metal is calcium, and the corresponding anion is $CO_3$.

\* \* \* \* \*

UNITED STATES PATENT AND TRADEMARK OFFICE
CERTIFICATE OF CORRECTION

PATENT NO. : 10,836,883 B2
APPLICATION NO. : 15/318556
DATED : November 17, 2020
INVENTOR(S) : Timothy Hebrink It is certified that error appears in the above-identified patent and that said Letters Patent is hereby corrected as shown below:

In the Specification

Column 7,
Line 39, delete "ofvinylidene" and insert -- of vinylidene --, therefor.

Column 11,
Line 38, delete "MBO1."" and insert -- MB01." --, therefor.
Line 65, delete "formula—[" and insert -- formula —[ --, therefor.

Column 14,
Line 59, delete "$R_t{}^c$" and insert -- $R_f{}^c$ --, therefor.
Line 67, delete "$R_f{}^a$" and insert -- $R_f{}^b$ --, therefor.

Column 15,
Lines 14 & 15, delete "—$[CF_2[CF_2CF_2O]_i[CF_2CF_2CF_2O]_j$—," and insert
-- —$[CF_2CF_2O]_i[CF_2CF_2CF_2O]_j$— --, therefor.
Line 30, delete "$(C_4F_5O)_{z'}($" and insert -- $(C_4F_8O)_{z'}($ --, therefor.

Column 19,
Line 20, delete "80°c)." and insert -- 80°C). --, therefor.

Column 20,
Line 31, delete "$C_2$-$C_5$" and insert -- $C_2$-$C_8$ --, therefor.

Column 26,
Line 29, delete ")$_z$(" and insert -- )$_{z'}$( --, therefor.
Line 31, delete "$R_f$" and insert -- $R_f{}^b$ --, therefor.
Line 37, delete "Rf" and insert -- $R_f{}^a$ --, therefor.
Line 40, delete "Rf" and insert -- $R_f{}^a$ --, therefor.
Line 41, delete "Rf" and insert -- $R_f{}^b$ --, therefor.

Signed and Sealed this
First Day of June, 2021

Drew Hirshfeld
*Performing the Functions and Duties of the
Under Secretary of Commerce for Intellectual Property and
Director of the United States Patent and Trademark Office*

Line 48, delete "($R\pm^b$—O—)$_z$," and insert -- ($R_f^b$—O—)$_z$' --, therefor.

Column 26,
Lines 51 & 52, delete "—[C$_3$F[CF$_2$CF$_2$O]$_i$[CF$_2$CF$_2$CF$_2$O]$_j$—," and insert
-- —[CF$_2$CF$_2$O]$_i$[CF$_2$CF$_2$CF$_2$O]$_j$—, --, therefor.
Line 67, delete "(C$_4$F$_5$O)$_{z'}$(" and insert -- (C$_4$F$_8$O)$_{z'}$( --, therefor.

Column 28,
Lines 45 & 46, delete "C(C)—C(R)" and insert -- C(O)—C(R$^1$) --, therefor.

Column 32,
Line 25, delete "C$_2$-C$_5$" and insert -- C$_2$-C$_8$ --, therefor.

Column 38,
Line 57, delete "ofvinylidene" and insert -- of vinylidene --, therefor.